United States Patent
Seo et al.

(10) Patent No.: US 9,312,993 B2
(45) Date of Patent: Apr. 12, 2016

(54) METHOD AND APPARATUS FOR TRANSMITTING CONTROL INFORMATION IN WIRELESS COMMUNICATION SYSTEM

(75) Inventors: Hanbyul Seo, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 14/129,670

(22) PCT Filed: Jun. 28, 2012

(86) PCT No.: PCT/KR2012/005119
§ 371 (c)(1),
(2), (4) Date: Dec. 27, 2013

(87) PCT Pub. No.: WO2013/002573
PCT Pub. Date: Jan. 3, 2013

(65) Prior Publication Data
US 2014/0146768 A1    May 29, 2014

Related U.S. Application Data

(60) Provisional application No. 61/502,841, filed on Jun. 29, 2011, provisional application No. 61/587,084, filed on Jan. 16, 2012, provisional application No. 61/615,340, filed on Mar. 25, 2012, provisional application No. 61/635,281, filed on Apr. 18, 2012, provisional application No. 61/657,005, filed on Jun. 7, 2012.

(51) Int. Cl.
*H04L 5/00* (2006.01)

(52) U.S. Cl.
CPC .............. *H04L 5/001* (2013.01); *H04L 5/0053* (2013.01); *H04L 5/0094* (2013.01)

(58) Field of Classification Search
CPC ... H04L 5/0053; H04L 5/0094; H04L 5/0055; H04L 5/001; H04L 5/0035; H04L 1/1861; H04L 1/0038; H04W 72/042; H04W 72/04; H04W 72/12; H04W 72/044; H04W 72/1278; H04W 48/12
See application file for complete search history.

(56) References Cited

U.S. PATENT DOCUMENTS

2009/0175231 A1* 7/2009 Seo et al. .............. 370/329
2011/0069637 A1   3/2011 Liu et al.
(Continued)

FOREIGN PATENT DOCUMENTS

EP          2439995 A2    4/2012
KR   10-2009-0111250 A   10/2009
(Continued)

OTHER PUBLICATIONS

3rd Generation Partnership Project; Technical Specification Group Radio Access Network; Evolved Universal Terrestrial Radio Access (E-UTRA); Physical layer procedures (Release 10), 3GPP TS 36.213 V10.2.0 (Jun. 2011), XP050553381, Jun. 22, 2011, pp. 1-120.

*Primary Examiner* — Benjamin H Elliott, IV
*Assistant Examiner* — Eric Nowlin
(74) *Attorney, Agent, or Firm* — Dentons US LLP

(57) ABSTRACT

The present invention pertains to a wireless communication system, and more particularly, to a method of receiving a downlink (DL) control channel in a wireless communication system and an apparatus therefor, and the method comprises the following steps: receiving a radio resource control (RRC) message including resource block (RB) allocation information; receiving a subframe having a plurality of physical RBs; and monitoring a plurality of downlink control channel candidates in a physical RB set corresponding to the RB allocation information from the plurality of physical RBs to detect a downlink control channel allocated to a communication device, wherein the plurality of downlink control channel candidates do not continuously exist in a virtual RB set corresponding to the physical RB set.

8 Claims, 16 Drawing Sheets

(56) References Cited

U.S. PATENT DOCUMENTS

| | | | |
|---|---|---|---|
| 2011/0075624 A1* | 3/2011 | Papasakellariou et al. ... | 370/329 |
| 2011/0249633 A1* | 10/2011 | Hong et al. ............. | 370/329 |
| 2011/0274066 A1* | 11/2011 | Tee et al. .............. | 370/329 |
| 2012/0054258 A1* | 3/2012 | Li .................. | H04W 72/0406 709/201 |
| 2012/0069764 A1* | 3/2012 | Classon et al. .......... | 370/252 |
| 2012/0106465 A1* | 5/2012 | Haghighat et al. ........ | 370/329 |
| 2013/0163551 A1* | 6/2013 | He ................... | H04W 4/06 370/329 |

FOREIGN PATENT DOCUMENTS

| | | |
|---|---|---|
| KR | 10-2010-0095129 A | 8/2010 |
| WO | 2007-082754 A1 | 7/2007 |
| WO | 2010-140828 A2 | 12/2010 |

\* cited by examiner

FIG. 13

| RB index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Aggregation level 1 | 0 | x | 1 | x | 2 | x | x | x | 3 | x | 4 | x | 5 | x | x | x |
| Aggregation level 2 | 0 | 0 | 1 | 1 | 2 | 2 | x | x | 3 | 3 | 4 | 4 | 5 | 5 | x | x |
| Aggregation level 4 | 0 | 0 | 0 | 0 | x | x | x | x | 1 | 1 | 1 | 1 | x | x | x | x |
| Aggregation level 8 | 0 | 0 | 0 | 0 | 0 | 0 | 0 | 0 | 1 | 1 | 1 | 1 | 1 | 1 | 1 | 1 |

FIG. 14

| RB index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Aggregation level 1 | 0 | 1 | 2 | 3 | 4 | 5 | x | x | x | x | x | x | x | x | x | x |
| Aggregation level 2 | 0 | 1 | 2 | 3 | 4 | 5 | 0 | 1 | 2 | 3 | 4 | 5 | x | x | x | x |
| Aggregation level 4 | 0 | 1 | 0 | 1 | 0 | 1 | 0 | 1 | x | x | x | x | x | x | x | x |
| Aggregation level 8 | 0 | 1 | 0 | 1 | 0 | 1 | 0 | 1 | 0 | 1 | 0 | 1 | 0 | 1 | 0 | 1 |

FIG. 15

| RB index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Aggregation level 1 | 0 | x | 1 | x | 2 | x | x | x | 3 | x | 4 | x | 5 | x | x | x |
| Aggregation level 2 | 0 | 0 | 1 | 1 | 2 | 2 | x | x | 3 | 3 | 4 | 4 | 5 | 5 | x | x |
| Aggregation level 4 | 0 | 1 | 0 | 1 | x | x | x | x | 0 | 1 | 0 | 1 | x | x | x | x |
| Aggregation level 8 | 0 | 1 | 0 | 1 | 0 | 1 | 0 | 1 | 0 | 1 | 0 | 1 | 0 | 1 | 0 | 1 |

FIG. 16

| RB index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Aggregation level 1 | 0 | x | 1 | x | 2 | x | x | x | 3 | x | 4 | x | 5 | x | x | x |
| Aggregation level 2 | 0 | 0 | 1 | 1 | 2 | 2 | x | x | 3 | 3 | 4 | 4 | 5 | 5 | x | x |
| Aggregation level 4 | 0 | 1 | x | x | 0 | 1 | x | x | 0 | 1 | x | x | 0 | 1 | x | x |
| Aggregation level 8 | 0 | 1 | 0 | 1 | 0 | 1 | 0 | 1 | 0 | 1 | 0 | 1 | 0 | 1 | 0 | 1 |

FIG. 17

RB index: 0, 1, 2, 3, 4, 5, 6, 7
subset index: 0 1, 2 3, 4 5, 6 7, 8 9, 10 11, 12 13, 14 15

| | | | | | | | | | | | | | | | | |
|---|---|---|---|---|---|---|---|---|---|---|---|---|---|---|---|---|
| Aggregation level 1 | 0 | x | 1 | x | 2 | x | x | x | 3 | x | 4 | x | 5 | x | x | x |
| Aggregation level 2 | 0 | 0 | 1 | 1 | 2 | 2 | x | x | 3 | 3 | 4 | 4 | 5 | 5 | x | x |
| Aggregation level 4 | 0 | 1 | x | x | 0 | 1 | x | x | 0 | 1 | x | x | 0 | 1 | x | x |
| Aggregation level 8 | 0 | 1 | 0 | 1 | 0 | 1 | 0 | 1 | 0 | 1 | 0 | 1 | 0 | 1 | 0 | 1 |

FIG. 18

RB index: 0, 1, 2, 3, 4, 5, 6, 7
subset index: 0 1, 2 3, 4 5, 6 7, 8 9, 10 11, 12 13, 14 15

| | | | | | | | | | | | | | | | | |
|---|---|---|---|---|---|---|---|---|---|---|---|---|---|---|---|---|
| Aggregation level 1 | x | 0 | x | 1 | x | 2 | x | x | x | 3 | x | 4 | x | 5 | x | x |
| Aggregation level 2 | 0 | 0 | 1 | 1 | 2 | 2 | x | x | 3 | 3 | 4 | 4 | 5 | 5 | x | x |
| Aggregation level 4 | x | x | 0 | 1 | x | x | 0 | 1 | x | x | 0 | 1 | x | x | 0 | 1 |
| Aggregation level 8 | 0 | 1 | 0 | 1 | 0 | 1 | 0 | 1 | 0 | 1 | 0 | 1 | 0 | 1 | 0 | 1 |

FIG. 24

METHOD AND APPARATUS FOR TRANSMITTING CONTROL INFORMATION IN WIRELESS COMMUNICATION SYSTEM

This Application is a 35 U.S.C. §371 National Stage Entry of International Application No. PCT/KR2012/005119, filed Jun. 28, 2012 and claims the benefit of U.S. Provisional Application Nos. 61/502,841, filed Jun. 29, 2011, 61/587,084, filed Jan. 16, 2012, 61/615,340, filed Mar. 25, 2012, 61/635,281, filed Apr. 18, 2012, and 61/657,005, filed Jun. 7, 2012, all of which are incorporated by reference in their entirety herein.

TECHNICAL FIELD

The present invention relates to a wireless communication system, and more particularly, to a method and apparatus for transmitting control information. The wireless communication system supports carrier aggregation (CA).

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

An object of the present invention devised to solve the problem lies in a method for efficiently transmitting control information in a wireless communication system and an apparatus for the same. Another object of the present invention is to provide a channel format, resource allocation method and signal processing method for efficiently transmitting control information and an apparatus for the same. A further object of the present invention is to provide a method for efficiently allocating resources for transmitting control information and an apparatus for the same.

The technical problems solved by the present invention are not limited to the above technical problems and those skilled in the art may understand other technical problems from the following description.

Technical Solution

The object of the present invention can be achieved by providing a method for receiving a downlink control channel by a communication device in a wireless communication system, the method including: receiving a radio resource control (RRC) message including resource block (RB) allocation information; receiving a subframe having a plurality of physical RBs; and monitoring a plurality of downlink control channel candidates in a physical RB set corresponding to the RB allocation information from among the plurality of physical RBs to detect a downlink control channel allocated to the communication device, wherein the plurality of downlink control channel candidates are non-consecutively present in a virtual RB set corresponding to the physical RB set.

In another aspect of the present invention, provided herein is a communication device for use in a wireless communication system, including: a radio frequency (RF) unit; and a processor, wherein the processor is configured to receive an RRC message including RB allocation information, to receive a subframe having a plurality of physical RBs and to monitor a plurality of downlink control channel candidates in a physical RB set corresponding to the RB allocation information from among the plurality of physical RBs to detect a downlink control channel allocated to the communication device, wherein the plurality of downlink control channel candidates are non-consecutively present in a virtual RB set corresponding to the physical RB set.

The plurality of downlink control channel candidates may be non-consecutively present in a plurality of sub-resources corresponding to the virtual RB set.

The plurality of downlink control channel candidates may be consecutively present in a plurality of sub-resources corresponding to the virtual RB set in the order of indices, wherein a plurality of sub-resources included in one virtual RB are non-sequentially indexed.

An index difference between sub-resources included in one virtual RB may be proportional to the number of RBs included in the virtual RB set.

The plurality of downlink control channel candidates may be present after a specific orthogonal frequency division multiplexing (OFDM) symbol in the subframe, and the specific OFDM symbol is not the first OFDM symbol of the subframe.

Physical RBs other than the physical RB set from among the plurality of physical RBs may be resources for physical downlink shared channel (PDSCH) transmission.

The downlink control channel may include an enhanced physical downlink control channel (E-PDCCH).

Advantageous Effects

According to the present invention, it is possible to efficiently transmit control information in a wireless communication system. In addition, it is possible to provide a channel format, resource allocation method and signal processing method for efficiently transmitting control information. Furthermore, it is possible to efficiently allocate resources for transmitting control information.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIGS. 13 to 25 illustrate examples of configuring an E-PDCCH search space according to embodiments of the present invention.

BEST MODE

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE. While the following description is given, centering on 3GPP LTE/LTE-A for clarity, this is purely exemplary and thus should not be construed as limiting the present invention.

In a wireless communication system, a UE receives information from a BS on downlink (DL) and transmits information to the BS on uplink (UL). Information transmitted/received between the BS and UE includes data and various type of control information, and various physical channels are present according to type/purpose of information transmitted/received between the UE and BS.

Figure 1:
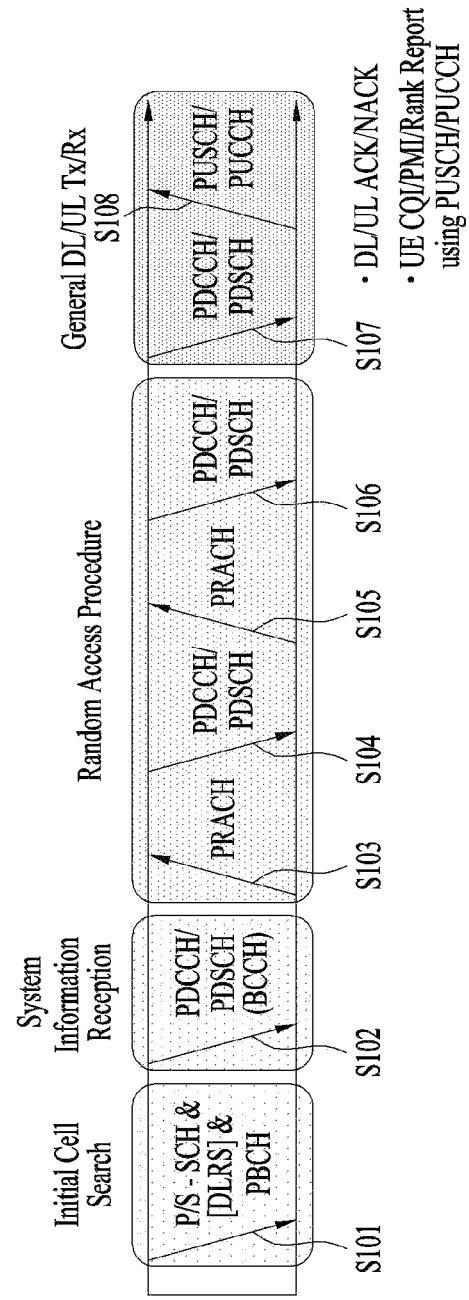
FIG. 1 illustrates physical channels used in a 3GPP LTE system as a wireless communication system and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
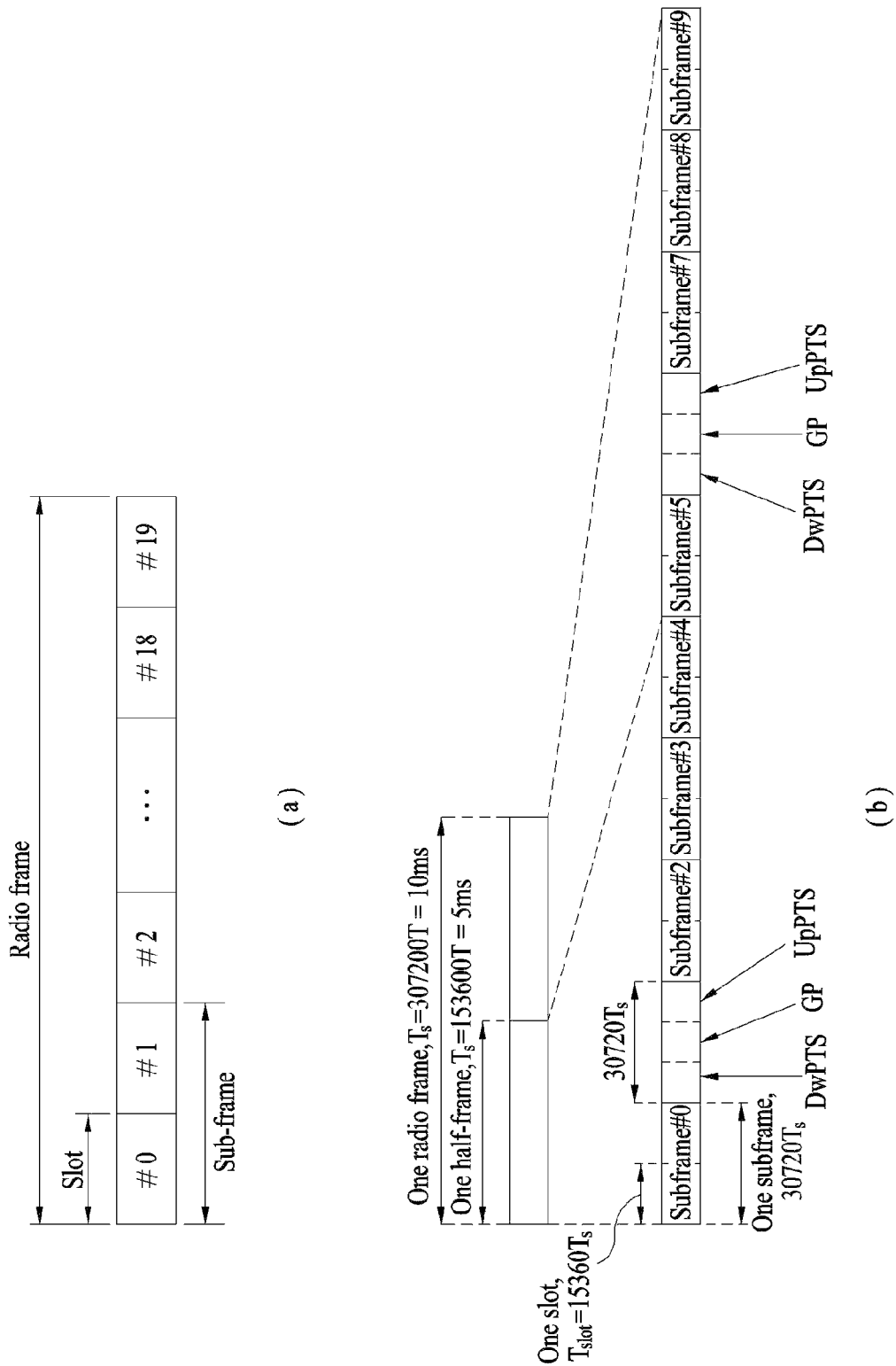
FIG. 2 illustrates a radio frame structure.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes. A subframe may be one of a downlink subframe, an uplink subframe and a special subframe. The special subframe can be used as a downlink subframe or an uplink subframe according to TDD configuration. The special subframe includes a downlink pilot time slot (DwPTS), a guard period (GP), and an uplink pilot time slot (UpPTS). The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL.

The above-described radio frame structure is merely exemplary and the number of subframes included in the radio frame, the number of slots included in a subframe, and the number of symbols included in a slot can be vary.

Figure 3:
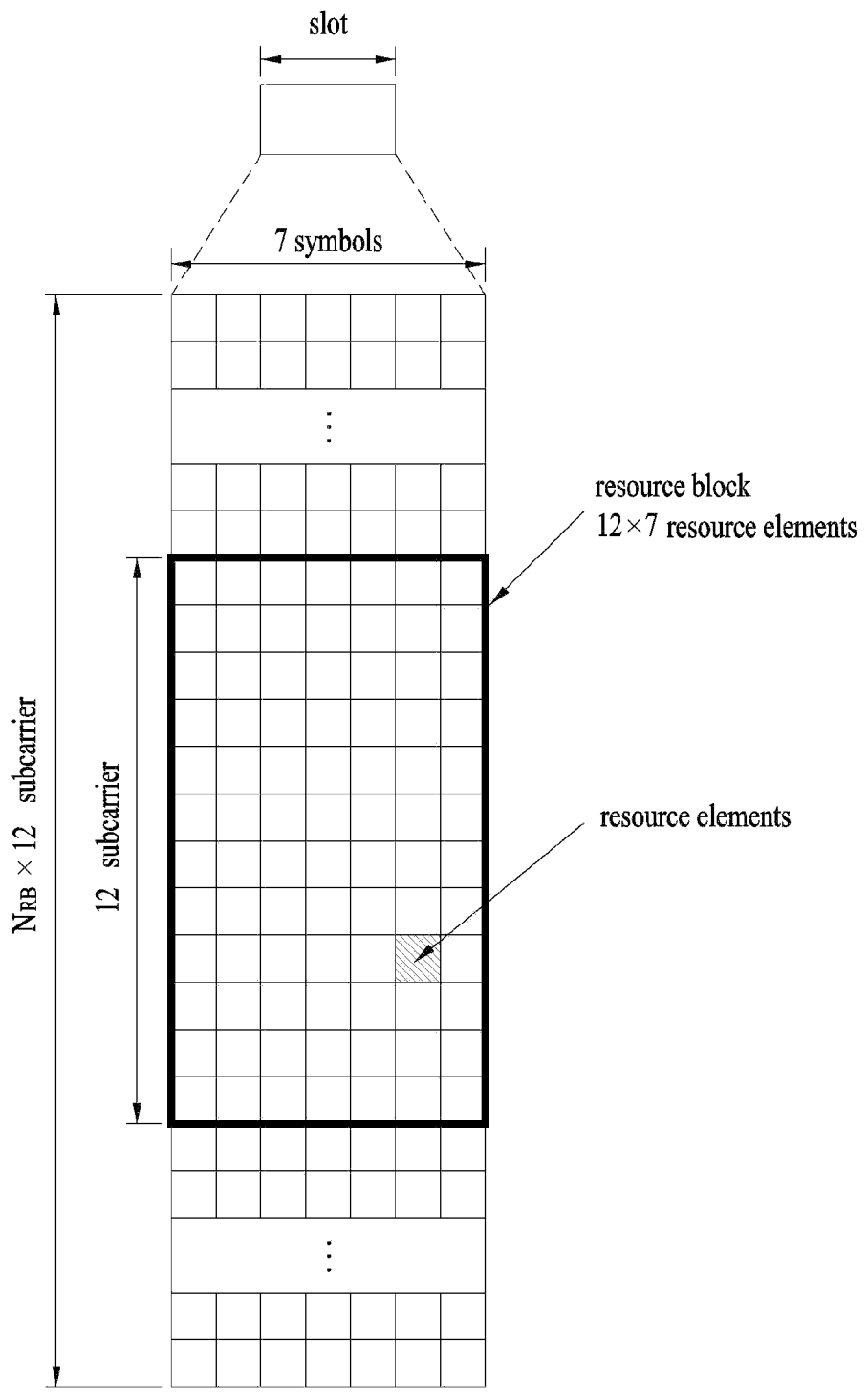
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot.

Figure 4:
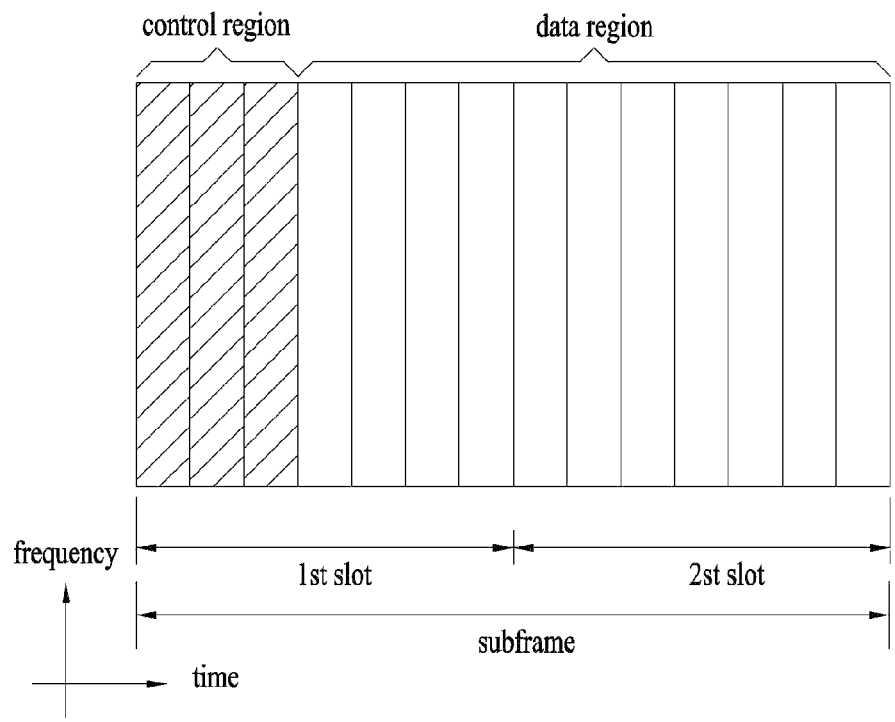
FIG. 4 illustrates a downlink subframe structure.

FIG. 4 illustrates a downlink subframe structure.

Referring to FIG. 4, a maximum of 3 OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/ negative-acknowledgment (NACK) signal. Control information transmitted through the PDCCH is referred to as downlink control information (DCI). The DCI includes uplink or downlink scheduling information or an uplink transmit (Tx) power control command for a UE group.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A PDCCH carries a message known as downlink control information (DCI) and DCI includes resource allocation information for a UE or UE group and other control information. Typically, a plurality of PDCCHs can be transmitted in one subframe. Each PDCCH is transmitted using one or more control channel elements (CCEs) each of which corresponds to 4 resource elements of 9 sets. 4 resource elements correspond to a resource element group (REG). 4 QPSK symbols are mapped to each REG. A resource element allocated by a reference signal is not included in an REG, and thus the total number of REGs in predetermined OFDM symbols depends on presence or absence of a cell-specific reference signal. The concept of REG (i.e. mapping on a group basis, each group including 4 resource elements) can be used for other downlink control channels (PCFICH and PHICH). 4 PDCCH formats are supported as listed in Table 1.

TABLE 1

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

The approach adopted for LTE is to define for each UE a limited set of CCE locations where a PDCCH may be placed. The set of CCE locations in which the UE may find PDCCHs thereof can be considered as a 'search space (SS)'. In LTE, the search space is a different size for each PDCCH format. Moreover, separate UE-specific and common search spaces are defined. The UE-specific search space is configured for each UE individually while all UEs are informed of the extent of the common search space. The UE-specific search space and common search spaces may overlap for a given UE. With such small search spaces, it is quite possible in a given subframe that the BS cannot find CCE resources to send PDCCHs to all the UEs that it would like to, because having assigned some CCE locations the remaining ones are not in the search space of a particular UE. To minimize the possibility of such blocking persisting into the next subframe, a UE-specific hopping sequence is applied to the starting positions of the UE-specific search spaces.

The sizes of the common and UE-specific search spaces are listed in Table 2.

TABLE 2

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to control the computational load arising from the total number of blind decoding attempts, the UE is not required to search for all the defined DCI formats simultaneously. Typically, in the UE-specific search space, the UE always searches for formats 0 and 1A, which are both the same size and are distinguished by a flag in the message. In addition, the UE may be required to receive a further format (e.g. 1, 1B or 2 depending on the PDSCH transmission mode configured by the BS. In the common search space, the UE searches for formats 1A and 1C. In addition the UE may be configured to search for format 3 or 3A, which have the same size as formats 0 and 1A, and may be distinguished by having CRC scrambled by a different (common) identifier, rather than a UE-specific identifier. The transmission mode for configuring the multi-antenna technique and the information content of DCI formats are listed below.

Transmission Mode
Transmission Mode 1: Transmission from a single BS antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Transmission using UE-specific reference signals DCI Format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Formats 3/3A: Power control commands for PUCCH and PUSCH with 2-bit/1-bit power adjustments Considering the above, the UE is required to carry out a maximum of 44 blind decoding operations in a subframe. This does not include checking the same message with different CRC values, which requires only a small additional computational complexity.

Figure 5:
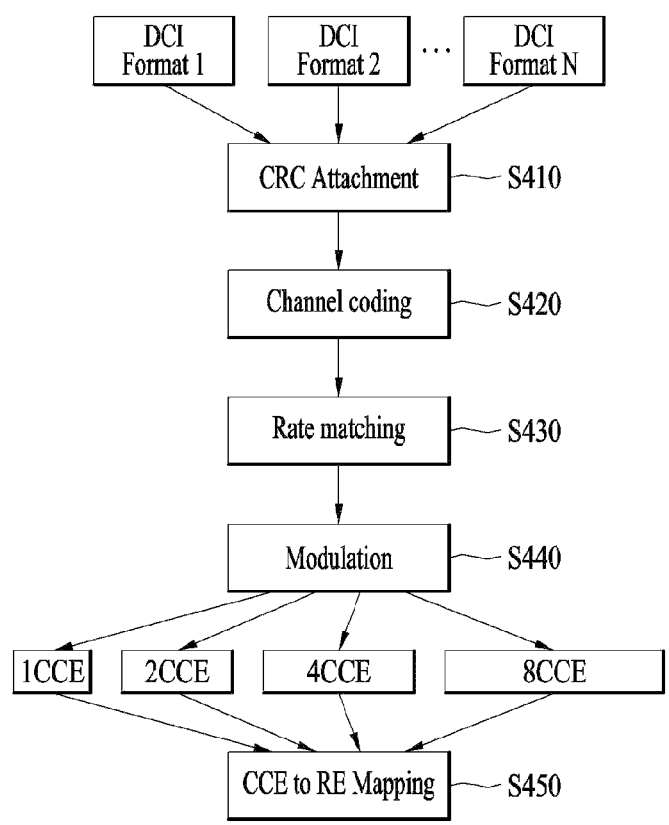
FIG. 5 illustrates a procedure through which a base station configures a PDCCH.

FIG. 5 is a flowchart illustrating a procedure through which the BS configures a PDCCH.

Referring to FIG. 5, the BS generates control information according to DCI format. The BS can select a DCI format from a plurality of DCI formats (DCI formats 1, 2, . . . , N) according to control information to be transmitted to a UE. In step S410, a CRC (cyclic redundancy check) for error detection is attached to control information generated based on each DCI format. The CRC is masked with an identifier (e.g. RNTI) according to an owner or usage of a PDCCH. In other words, the PDCCH is CRC-scrambled with the identifier (e.g. RNTI).

Table 3 shows examples of identifiers masking the PDCCH.

TABLE 3

| Type | Identifier | Description |
|---|---|---|
| UE-specific | C-RNTI, temporary C-RNTI, semi-persistent C-RNTI | Used for unique identification of UE |
| Common | P-RNTI | Used for paging messages |
| | SI-RNTI | Used for system information |
| | RA-RNTI | Used for random access response |

When C-RNTI, temporary C-RNTI or semi-persistent C-RNTI is used, the PDCCH carries control information for the corresponding UE. When other RNTIs are used, the PDCCH carries common control information received by all UEs in a cell. In step S420, the CRC-attached control information is channel-coded, generating coded data. In step S430, rate matching based on a CCE aggregation level allocated to a PDCCH format is performed. In step S440, the coded data is modulated to generate modulated symbols. Modulated symbols constituting a PDCCH may have one of CCE aggregation levels of 1, 2, 4 and 8. In step S450, the modulated symbols are mapped to physical REs.

Figure 6:
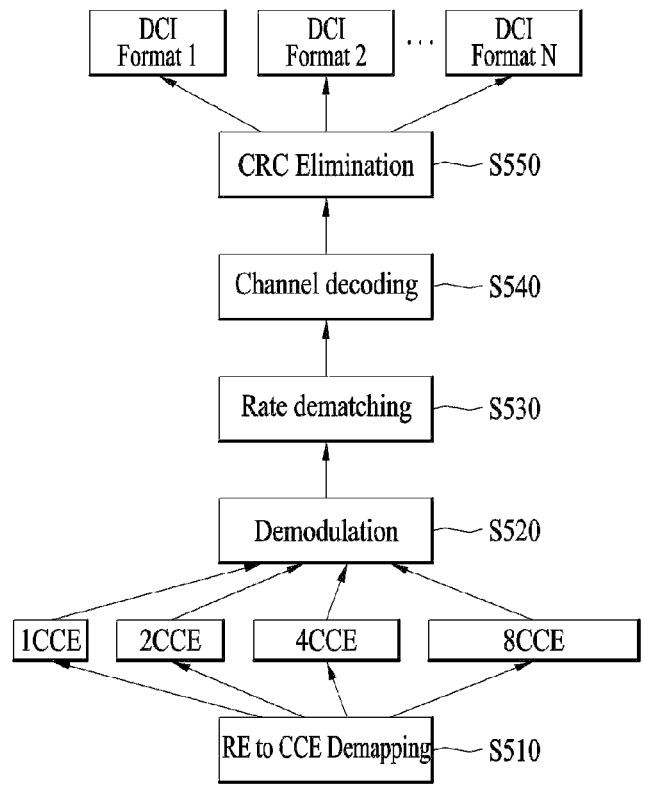
FIG. 6 illustrates a procedure through which a UE processes a PDCCH.

FIG. 6 is a flowchart illustrating a procedure through which the UE processes the PDCCH.

Referring to FIG. 6, the UE demaps the physical REs to CCEs in step S510. The UE performs demodulation for each CCE aggregation level in step S520 since the UE does not know a CCE aggregation level at which the UE needs to receive the PDCCH. The UE performs rate dematching on the demodulated data in step S530. The UE carries out rate dematching for each DIC format (or DCI payload size) since the UE does not know a DCI format (or DCI payload size) corresponding to information that needs to be received by the UE. The UE performs channel decoding on the rate-dematched data according to coding rate and detects whether an error is generated by checking the CRC in step S540. When no error is generated, the UE detects the PDCCH corresponding thereto. If the error is generated, the UE continuously performs blind decoding for other CCE aggregation levels or other DCI formats (or DCI payload sizes). Upon detection of the PDCCH, the UE removes the CRC from the decoded data and acquires the control information in step S550.

A plurality of PDCCHs for a plurality of UEs can be transmitted in a control region of the same subframe. The BS does not provide information about the position of a PDCCH in the control region to a UE corresponding to the PDCCH. Accordingly, the UE searches the subframe for the PDCCH thereof by monitoring a set of PDCCH candidates. Here, monitoring refers to a process through the UE attempts to decode received PDCCH candidates according to each DCI format. Monitoring is also referred to as blind detection. The UE simultaneously performs identification of the PDCCH transmitted thereto and decoding of control information transmitted through the PDCCH using blind detection. For example, when the PDCCH is de-masked with C-RNTI, the UE detects the PDCCH thereof if no CRC error is generated.

To reduce blind detection overhead, the number of DCI formats is defined as smaller than the number of types of control information transmitted using the PDCCH. DCI formats include different information fields. Information field type, the number of information fields and the number of bits of each information field vary according to DCI format. In addition, the size of control information matched to a DCI format depends on the DCI format. A DCI format can be used to transmit two or more types of control information.

Table 4 shows examples of control information transmitted using DCI format 0. The bit size of each information field is exemplary and is not limited to Table 4.

TABLE 4

| | Information Field | Bit(s) |
|---|---|---|
| (1) | Flag for discriminating between format 0 and format 1A | 1 |
| (2) | Hopping flag | 1 |
| (3) | Resource block allocation and hopping resource allocation | $\lceil \log_2(N_{RB}^{UL}(N_{RB}^{UL}+1)/2) \rceil$ |
| (4) | Modulation and coding scheme and redundancy version | 5 |
| (5) | New data indicator | 1 |
| (6) | TPC command for scheduled PUSCH | 2 |
| (7) | Cyclic shift for DM RS | 3 |
| (8) | UL index (TDD) | 2 |
| (9) | CQI request | 1 |

The flag field is an information flag for discriminating between format 0 and format 1A. That is, DCI format 0 and DCI format 1A have the same payload size and are discriminated from each other by flag fields. The bit size of the resource block allocation and hopping resource allocation field may vary according to hopping PUSCH or non-hopping PUSCH. The resource block allocation and hopping resource allocation field for the non-hopping PUSCH provides $\lceil \log_2(N_{RB}^{UL}(N_{RB}^{UL}+1)/2) \rceil$ bits for resource allocation of the first slot in an uplink subframe. Here, $N_{RB}^{UL}$ denotes the number of RBs included in an uplink slot and depends on an uplink transmission bandwidth set in a cell. Accordingly, the payload size of DCI format 0 can depend on an uplink bandwidth. DCI format 1A includes information field for PDSCH allocation. The payload size of the DCI format 1A can depend on a downlink bandwidth. DCI format 1A provides a reference information bit size for DCI format 0. Accordingly, '0' is added to DCI format 0 until the payload size of DCI format 0 becomes identical to the payload size of DCI format 1A when the number of information bits of DCI format 0 is less than the number of information bits of DCI format 1A. The added '0' is filled in a padding field of DCI format.

Figure 7:
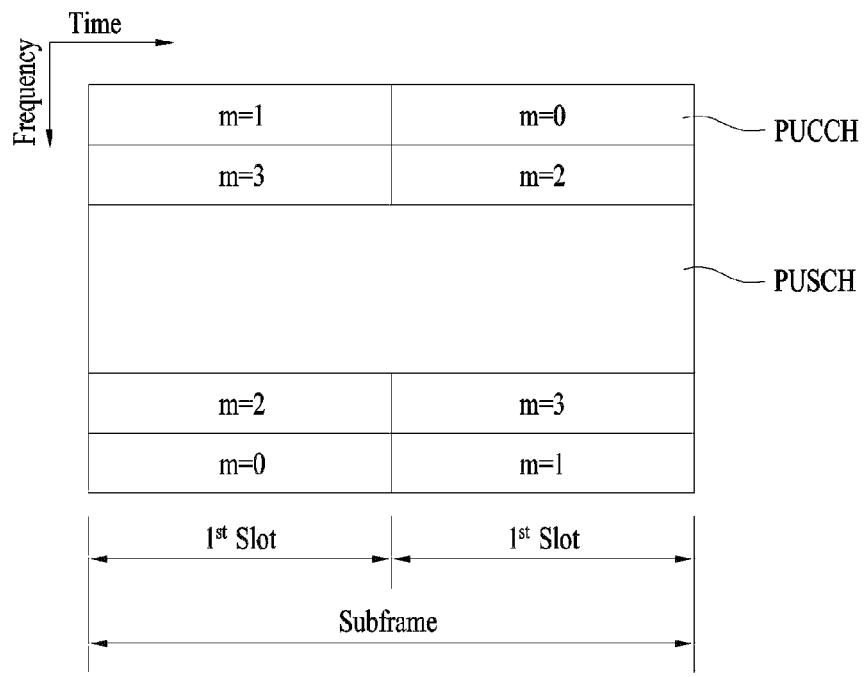
FIG. 7 illustrates an uplink subframe structure.

FIG. 7 illustrates an uplink subframe structure used in LTE.

Referring to FIG. 7, an uplink subframe includes a plurality of (e.g. 2) slots. A slot may include different numbers of SC-FDMA symbols according to CP lengths. For example, a slot can include 7 SC-FDMA symbols in the normal CP case. The uplink subframe is divided into a control region and a data region in the frequency domain. The data region is allocated with a PUSCH and used to carry a data signal such as audio data. The control region is allocated a PUCCH and used to carry control information. The PUCCH includes an RB pair located (e.g. m=0, 1, 2 and 3) at both ends of the data region in the frequency domain and hopped in a slot boundary. The control information includes HARQ ACK/NACK, CQI (channel quality information), PMI (precoding matrix indicator), RO (rank indicator), etc.

Figure 8:
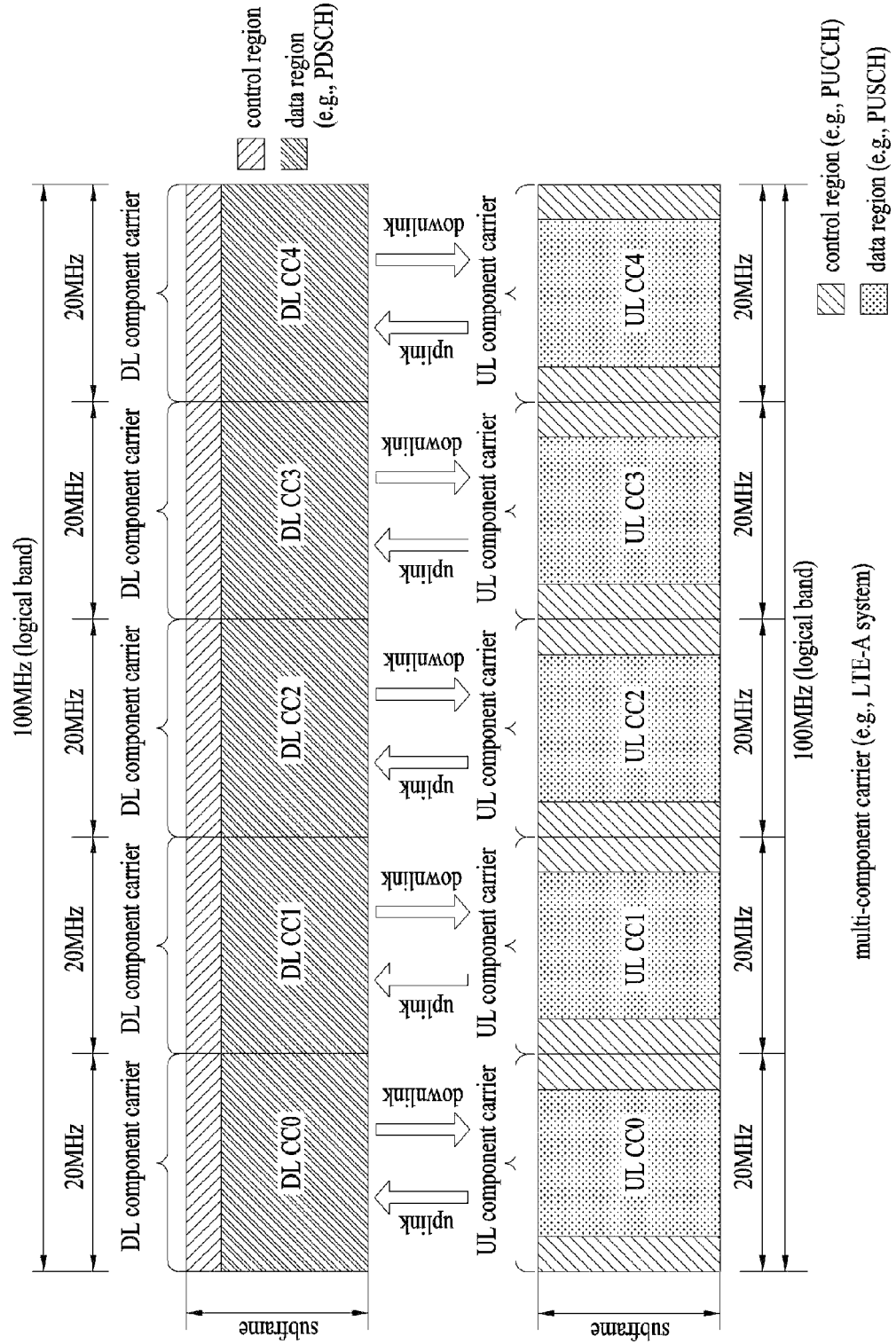
FIG. 8 illustrates a CA (carrier aggregation) communication system.

FIG. 8 illustrates a carrier aggregation (CA) communication system.

Referring to FIG. 8, a plurality of uplink/downlink component carriers (CCs) can be aggregated to support a wider uplink/downlink bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC can be referred to as a primary CC (PCC) and other CCs can be referred to as secondary CCs (SCCs). For example, when cross-carrier scheduling (or cross-CC scheduling) is applied, a PDCCH for downlink allocation can be transmitted through DL CC#0 and a PDSCH corresponding to the PDCCH can be transmitted through DL CC#2. The term "component carrier" can be replaced by other equivalent terms (e.g. carrier, cell, etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have the CIF

CIF corresponds to a fixed x-bit field (e.g. x=3) (when the CIF is set).

CIF position is fixed irrespective of DCI format size (when the CIF is set).

When the CIF is present, the BS can allocate a PDCCH monitoring DL CC (set) to reduce BD complexity of the UE. For PDSCH/PUSCH scheduling, a UE can detect/decode a PDCCH only in the corresponding DL CC. The BS can transmit the PDCCH only through the monitoring DL CC (set). The monitoring DL CC set can be set UE-specifically, UE-group-specifically or cell-specifically.

Figure 9:
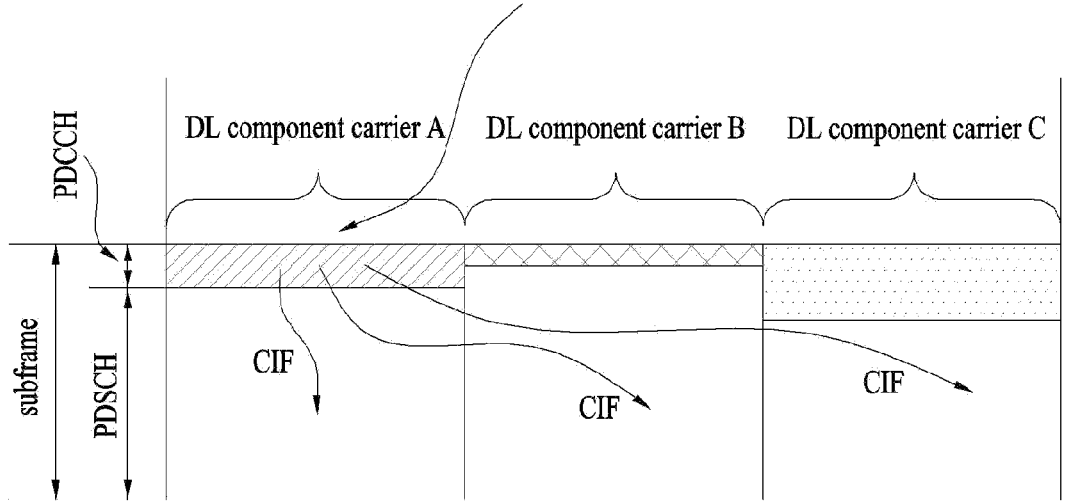
FIG. 9 illustrates cross-carrier scheduling.

FIG. 9 illustrates a case in which 3 DL CCs are aggregated and DL CC A is set to a monitoring DL CC. When the CIF is disabled, each DL CC can carry a PDCCH that schedules a PDSCH of the DL CC without the CIF according to LTE PDCCH rules. When the CIF is enabled through higher layer signaling, only DL CC A can carry not only a PDSCH thereof but also PDSCHs of other DL CCs using the CIF. DL CC B and DL CC C which are not set to monitoring DL CCs do not carry a PDCCH. Here, the term "monitoring DL CC" can be replaced by the terms such as "monitoring carrier", "monitoring cell", "scheduling carrier", "scheduling cell", "serving carrier", "serving cell", etc.

Figure 10:
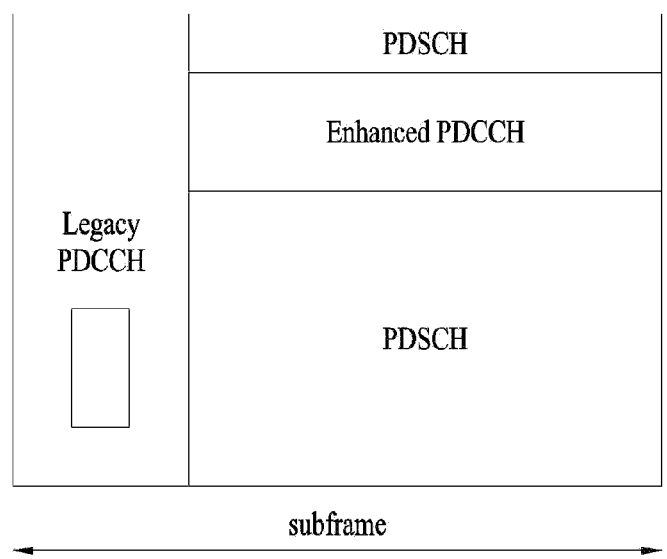
FIG. 10 illustrates an example of allocating a PDCCH to a data region of a subframe.

FIG. 10 illustrates an example of allocating downlink physical channels to a subframe.

Referring to FIG. 10, a PDCCH (legacy PDCCH) according to legacy LTE can be allocated to a control region of the subframe. A PDCCH can be additionally allocated to a data region (e.g. a resource region for a PDSCH) of the subframe. The PDCCH allocated to the data region is referred to as an advanced PDCCH (A-PDCCH) or enhanced PDCCH (E-PDCCH) for convenience. FIG. 10 illustrates a case in which one E-PDCCH is present through two slots of the subframe. However, this is exemplary and an E-PDCCH can be present per slot. For example, an E-PDCCH for a DL grant can be transmitted in the first slot and an E-PDCCH for a UL grant can be transmitted in the second slot.

A description will be given of a method for allocating and operating resources for a downlink control channel using the data region (e.g. a PDSCH) of a subframe with reference to the attached drawings. While the following description focuses on the relationship between a BS and a UE for convenience, the present invention is equally/similarly applicable to operations between a BS and a relay or between a relay and a UE. Accordingly, BS-UE can be replaced by BS-relay or relay-UE in the following description. A relay and a UE can be generalized as a receiver in terms of signal reception. When the relay operates as a receiver, an E-PDCCH can be replaced by a relay-PDCCH (R-PDCCH).

The E-PDCCH will now be described in more detail. The E-PDCCH carries DCI. For details of DCI, refer to Table 1. For example, the E-PDCCH can carry downlink scheduling information and uplink scheduling information. A signal processing procedure using an E-PDCCH/PDSCH and a signal processing procedure using an E-PDCCH/PUSCH are identical/similar to steps S107 and S108 of FIG. 1. That is, a UE can receive an E-PDCCH and then receive data/control information through a PDSCH corresponding to the E-PDCCH. In addition, the UE can receive the E-PDCCH and then receive data/control information through a PUSCH corresponding to the E-PDCCH. E-PDCCH transmission processing (e.g. channel coding, interleaving, multiplexing, etc.) can be performed using processing (refer to FIGS. 5 and 6) defined in LTE and modified as necessary.

LTE adopts a method of reserving a PDCCH candidate region (referred to as a PDCCH search space hereinafter) in a control region and transmitting a PDCCH for a specific UE in part of the PDCCH search space. Accordingly, the UE can obtain the PDCCH corresponding thereto within the PDCCH search space through blind decoding. Similarly, an E-PDCCH can also be transmitted through some or all reserved resources.

Figure 11:
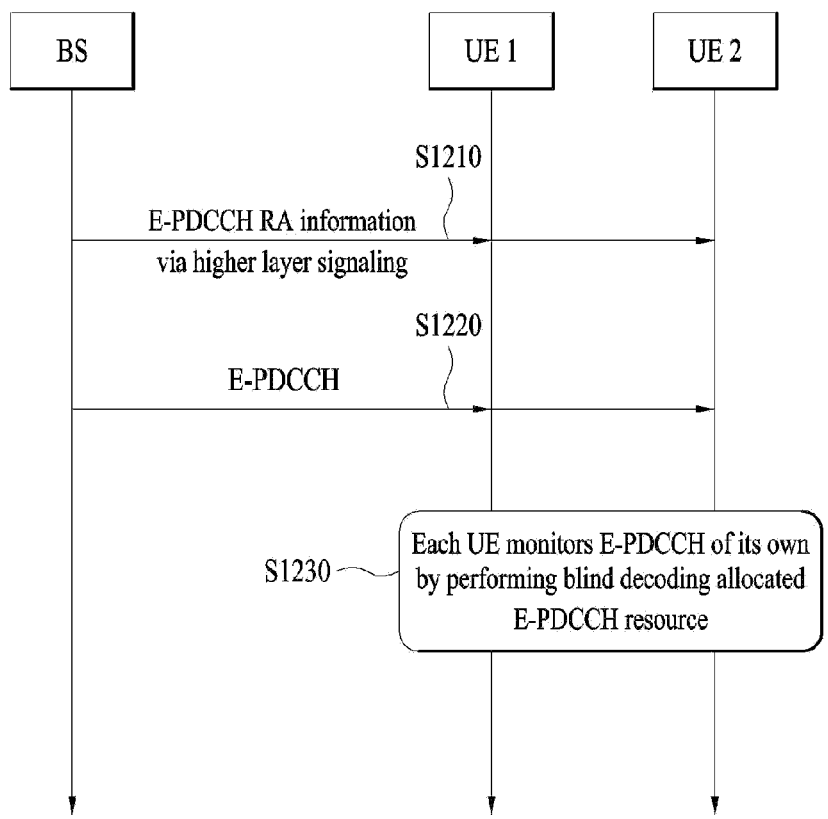
FIG. 11 illustrates a procedure for allocating resources for an E-PDCCH and receiving a PDSCH.

FIG. 11 illustrates a procedure of allocating resources for E-PDCCHs and receiving the E-PDCCHs.

Referring to FIG. 11, a BS transmits E-PDCCH resource allocation (RA) information to UEs (S1210). The E-PDCCH RA information may include RB (or VRB (virtual resource block) allocation information. The RB allocation information can be provided per RB or RBG. The E-PDCCH RA information can be transmitted through higher layer (e.g. RRC) signaling. Here, the E-PDCCH RA information is used to reserve E-PDCCH resources (regions). Then, the BS transmits an E-PDCCH to each UE (S1220). The E-PDCCH can be transmitted within some or all E-PDCCH resource (e.g. M RBs) reserved in step S1210. Accordingly, the corresponding UE monitors a resource (region) (referred to as an E-PDCCH search space, simply, search space, hereinafter) in which the E-PDCCH can be transmitted (S1230). The E-PDCCH search space can be provided as a part of an RB set allocated in step S1210. Here, monitoring includes blind decoding of a plurality of E-PDCCH candidates in the search space.

DCI (e.g. a DL grant and UL grant) mapped to the E-PDCCH resource (e.g. RBs) may not be cross-interleaved. In this case, only a single E-PDCCH is transmitted through one or more RBs. In addition, the DCI mapped to the E-PDCCH resource may be intra-RB-interleaved. Furthermore, the DCI mapped to the E-PDCCH resource may be inter-RB-interleaved. In this case, a plurality of E-PDCCHs can be simultaneously transmitted through one or more RBs.

The present invention proposes a method for efficiently configuring a search space for an E-PDCCH. In the case of E-PDCCH, DCI and an RS can be precoded together in order to obtain precoding gain. The E-PDCCH can be transmitted such that only an E-PDCCH corresponding to one UE is present in one RB (non-cross interleaving) in order to obtain frequency selective scheduling gain (MU-MIMO in which plural E-PDCCH are discriminated according to beamforming may be an exception). The R-PDCCH is transmitted in a PDSCH region and the E-PDCCH can be replaced by the R-PDCCH in the specification.

The E-PDCCH search space can be limited to a set of specific RBs because an excessively large number of E-PDCCH blind decoding operations are needed if the entire band is configured as the search space. The RB set for the search space can be semi-statically determined and may be changed on a subframe-by-subframe basis through a pseudo-random hopping procedure according to a UE-specific parameter.

A description will be given of a method for determining a candidate position in which an E-PDCCH can be transmitted in an RB set determined for an E-PDCCH search space within one subframe. The candidate position can be given per aggregation level. Here, the candidate position can refer to a resource through which an E-PDCCH (candidate) is transmitted or a resource index indicating the resource through which the E-PDCCH (candidate) is transmitted. The E-PDCCH (candidate) is transmitted using one or more resource units (e.g. RBs, RB pairs, CCEs) according to aggregation level. When the E-PDCCH (candidate) is transmitted using a plurality of resource units, the candidate position can be specified by a resource set consisting of the plurality of resource units or a specific resource unit representative of the plurality of resource units. Unless otherwise mentioned, the term candidate position is used interchangeably with the terms E-PDCCH and E-PDCCH candidate in the specification.

It is assumed that an E-PDCCH corresponding to aggregation level L is transmitted through L RBs in the following description for convenience. In addition, it is assumed that when N RBs are indexed as #0, #1, . . . , #N−1 when the N RBs configure a search space. The RBs for the search space can be mapped to PRBs according to an appropriate mapping rule (in this case, an RB means a VRB). A VRB-to-PRB mapping method may include localized VRB mapping and distributed VRB mapping of LTE.

A simple method of configuring the search space using the N RBs is to sequentially aggregate RBs starting from index #0 to configure candidate positions at each aggregation level. That is, in the case of an E-PDCCH corresponding to aggregation level 1, each of RBs #0, #1, . . . , #$L_1$−1 can be set as one E-PDCCH candidate position. In the case of an E-PDCCH search space corresponding to aggregation level 2, [RB #0, RB #1], [RB #2, RB #3], . . . , [RB #2*$L_2$−2, RB #2*$L_2$−1] can be respectively set as E-PDCCH candidate positions. Search spaces corresponding to aggregation levels 4 and 8 can be configured through the same principle. Here, $L_k$ denotes the number of candidate positions at aggregation level k, k representing an aggregation level.

Figure 12:
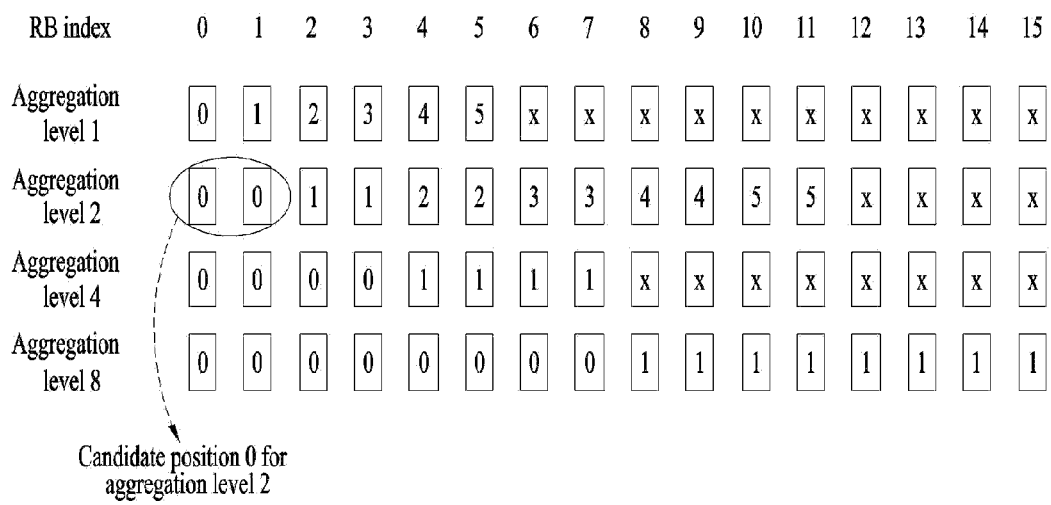
FIG. 12 is diagram for explaining problems when an E-PDCCH search space is configured.

FIG. 12 illustrates configuration of search spaces when $L_1$=6, $L_2$=6, $L_4$=2 and $L_8$=2. In FIG. 12, it is assumed that 15 RBs (e.g. VRBs) are allocated in step S1210 of FIG. 11. 6, 12, 8 and 16 RBs are necessary to transmit E-PDCCH candidates for respective aggregation levels since $L_1$=6, $L_2$=6, $L_4$=2 and $L_8=2$. Referring to FIG. 12, RBs (e.g. VRBs) necessary for E-PDCCH candidate transmission at each aggregation level are consecutively allocated starting from index #0. In FIG. 12, a number in a box represents an E-PDCCH candidate index or candidate position index. A UE sequentially blind-decodes E-PDCCH candidates at each aggregation level in order to check an E-PDCCH allocated thereto.

The search space configuration method illustrated in FIG. 12 is inefficient in the case of localized virtual resource block (LVRB) mapping (i.e. $n_{PRB}=n_{VRB}$) by which RBs (i.e. VRBs) configuring a search space are mapped to PRBs (physical resource blocks). Here, $n_{PRB}$ denotes a PRB index and $n_{VRB}$ denotes a VRB index. Specifically, at aggregation level 1, 6 candidate positions are concentrated on lower RB indices. Consequently, RBs corresponding to RB indices #6 to #15 cannot be used for E-PDCCH transmission even though the RBs are available, which is inefficient for frequency selective scheduling. Particularly, when LVRB mapping is used, there is high probability of similar channel states for RB indices close to each other, and thus inefficiency of the above-described search space configuration scheme in terms of frequency selective scheduling increases.

To solve this problem, the present invention proposes arrangement of non-consecutive candidate positions in at least part of a resource unit set (e.g. RB set) for a search space. Here, arrangement of non-consecutive candidate positions includes placement of non-consecutive E-PDCCH (candidates) per E-PDCCH or per resource unit (e.g. RB) constituting an E-PDCCH. For example, if an RB is designated as a candidate position in a search space corresponding to a specific aggregation level, the next RB may not be designated as a candidate position. In this case, one RB may not be designated as a candidate position or RBs corresponding to the specific aggregation level may not be designated as candidate positions. Accordingly, candidate positions of the specific aggregation level can be uniformly distributed in the RB set. Particularly, the search space configuration method may be advantageous for a search space corresponding to a low aggregation level.

FIG. 13 illustrates application of the above-described method to aggregation levels 1, 2 and 4 of FIG. 12. In the case of aggregation level 1, an RB that is not designated as a candidate position is present between candidate positions #0 and #1 and between candidate positions #1 and #2. In addition, an RB that is not designated as a candidate position is present between candidate positions #3 and #4 and between candidate positions #4 and #5. Three RBs that are not defined as candidate positions are present between candidate positions #2 and #3 in order to configure the RB set in a symmetrical structure. Candidate positions #3, #4 and #5 may be respectively defined as RBs #6, #8 and #10 as necessary. This principle can be applied to aggregation levels 2 and 4 such that candidate positions can be spaced as far apart as possible within the given RB set.

The scheme illustrated in FIG. 12 has a disadvantage that consecutive RBs are used even at a high aggregation level. Considering that aggregation levels 4 and 8 are used for poor channel states in general, utilization of frequency diversity using distributed RBs may be preferable to frequency selective scheduling using consecutive RBs. Accordingly, the present invention proposes a method of setting candidate positions in such a manner that candidate positions alternately use resource units (e.g. RBs) for an E-PDCCH. For example, at aggregation level L, M RBs can be alternately allocated to candidate positions before L RBs are assigned to one position. Here, M is the divisor of L. For example, if an aggregation level L is 8, then M may be 1, 2 or 4. This scheme is applicable only to some aggregation levels.

FIG. 14 illustrates application of the above-described method to aggregation levels 2, 4 and 8 of FIG. 12. Through this method, RBs corresponding to one candidate position can be spaced as far apart as possible to obtain frequency diversity gain.

It is possible to combine the schemes illustrated in FIGS. 13 and 14 to configure a search space. For example, the scheme of FIG. 13 can be used at a specific aggregation level and the scheme of FIG. 14 can be used at a different aggregation level. An RB set used to determine candidate positions at a specific aggregation level can be determined using the scheme of FIG. 13 and an RB used for each candidate position in the RB set can be determined using the scheme of FIG. 14.

FIG. 15 illustrates a hybrid of the schemes of FIGS. 13 and 14. Referring to FIG. 15, the scheme of FIG. 13 is applicable to aggregation levels 1 and 2 and the scheme of FIG. 14 is applicable to aggregation level 8. In the case of aggregation level 4, an RB set (i.e. RBs #0, #1, #2, #3, #8, #9, #10 and #11) can be determined using the scheme of FIG. 13 and RBs within the RB set can be alternately allocated to a plurality of (e.g. 2) candidate positions, as illustrated in FIG. 14. In other words, at aggregation level 4, a plurality of (e.g. $L_4(=2)$) subsets each of which consists of 4 RBs corresponding to the aggregation level are non-consecutively configured, preferably, spaced as far apart as possible and M (e.g. M=1) RB is alternately allocated to candidate positions in each subset, as illustrated in FIG. 14.

FIG. 16 illustrates a modification of the scheme of FIG. 15.

Referring to FIG. 16, at aggregation level 4, RBs #4, #5, #12 and #13 instead of RBs #2, #3, #10 and #11 are used such that RBs occupied by candidate positions can be spaced as far apart as possible. In other words, N RBs can be divided into RB subsets each of which consists of $L_4 (=2)$ consecutive RBs and a number of (e.g. 4) RB subsets necessary according to aggregation level can be selected such that the RB subsets are spaced as far apart as possible. Each candidate position can alternately occupy the RBs in each subset, as illustrated in FIG. 14. Accordingly, frequency diversity gain of aggregation level can increase.

In the above-described search space determination method, it is assumed that N RB sets are circular sets. That is, it can be assumed that RBs #0, #1, . . . are repeated after RB #N−1 and the spacing between RB #0 and RB #N−1 corresponds to one index. This assumption is suitable to a case in which a search space is hopped on a subframe-by-subframe basis because an RB hopped to RB #N+k can be easily mapped to RB #k through a modulo N computation. Otherwise, it can be assumed that N RBs are linear sets and thus no RB is present after RB #N−1. In this case, the spacing between RB #0 and RB #N−1 can be assumed to be N−1 indices. This assumption is suitable for a case in which a search space is semi-statically fixed.

While it is assumed that the E-PDCCH corresponding to aggregation level L is transmitted using L RBs in the above description, the present invention is not limited thereto. For example, one RB (or RB pair) can be divided into a plurality of subsets and the E-PDCCH corresponding to aggregation level L can be transmitted using L subsets. Here, a subset corresponds to a basic resource unit for E-PDCCH transmission and can be referred to as an advanced control channel element (A-CCE), enhanced CCE (E-CCE) or simply CCE. A description will be given of a case in which an RB subset (i.e. A-CCE or E-CCE) is used as a basic resource unit for E-PDCCH transmission.

The E-PDCCH of aggregation level L can be transmitted using L subsets while the subsets respectively belong to different RBs. This scheme is effective to obtain frequency diversity since the E-PDCCH is transmitted using a plurality of RBs. To achieve this, a preconfigured RB set can be divided into subsets and an additional index can be assigned to each subset. Then, the above-described scheme can be equally applied if the RB indices in FIGS. 12 to 16 are replaced by subset indices.

FIG. 17 illustrates search space configuration when one RB consists of two subsets. FIG. 17 corresponds to the scheme of FIG. 16.

Referring to FIG. 17, in the case of aggregation level 1, candidate positions correspond to different RBs. While frequency selective E-PDCCH placement cannot be performed when a plurality of candidate positions correspond to one RB, the E-PDCCH is easily transmitted frequency-selectively since only one candidate position corresponds to one RB according to this scheme. In the case of aggregation level 2, since two subsets of each candidate position are allocated to the same RB, the same precoding scheme is applicable to the two subsets. Accordingly, effective beamforming for E-PDCCH transmission can be performed if the BS knows channel information. In the case of aggregation levels 4 and 8, E-PDCCHs are transmitted using subsets belonging to RBs which are spaced apart, and thus frequency diversity is obtained. The above-described operation is applicable to a case in which one RB (or RB pair) is divided into three or more subsets.

As described above, non-consecutive placement of starting points of candidate positions with a gap may be effective at a single aggregation level. In one embodiment, the gap can be determined by the aggregation level or the number of subsets (e.g. A-CCEs or E-CCEs) included in one RB (or RB pair). For example, if one RB (or RB pair) includes K subsets, gap (or offset) of a*K+K−1 (a=0, 1, 2, . . . ) can be applied between starting points of candidate positions at the corresponding aggregation level. The start points of candidate positions can be appropriately distributed to correspond to different RBs by applying a gap thereto. Referring to FIG. 17, a=0 at aggregation levels 1 and 2 (i.e. gap is 1) when K=2. For candidate positions 2 and 3, a=1 is set and thus the gap therebetween becomes 3. This serves to distribute candidate positions over 8 RBs configured for a search space more uniformly. As illustrated in FIG. 17, different gaps can be set for respective aggregation levels and a different value can be given as a gap at a specific position for candidate position optimization.

When an excessively large number of RBs is configured as a search space, the number of RBs on which a UE performs channel estimation increases and thus implementation of the UE may become very complicated. Accordingly, the BS can detect a maximum number of RBs on which the UE can perform channel estimation in the search space and configure a number of RB sets belonging to the search space, which is equals to or less than the maximum number. For example, when the number of candidate positions of aggregation level k is $L_k$, the maximum number of RBs belonging to the search space can be given as max $\{k*L_k\}$ for k=1, 2, 4 and 8. Here, $k*L_k$ denotes the number of RB sets which the search space of aggregation level k spans on the assumption that subsets constituting all candidate positions are present in different RBs at aggregation level k. That is, the channel estimation performance of UE is specified based on a maximum value of $k*L_k$ (k=1, 2, 4 and 8). For example, when $L_1$=6, $L_2$=6, $L_4$=2 and $L_8$=2, $k*L_k$ is set to 6, 12, 8 and 16, respectively, and thus the maximum number of RBs belonging to the search space is limited to 16. If candidate positions of a high aggregation level such as aggregation level 8 are not present in an E-PDCCH search space or all subsets are not transmitted through different RBs even though the candidate positions are present (e.g. E-PDCCH corresponding to aggregation level 8 is transmitted using two subsets in one RB), a specific aggregation level can be excluded in the procedure of determining the maximum number of RBs belonging to the search space. For example, if aggregation level 8 is excluded in the above example, the maximum number of RBs belonging to the search space can be 12. This restriction can be imposed per common search space or UE-specific search space. In addition, this restriction can be imposed per component carrier or CoMP cell in a carrier aggregation environment or CoMP environment.

While it is assumed that subset indices are sequentially given according to RB index in FIG. 17, the present invention is not limited thereto and there are various methods for indexing subsets. For example, the first subsets of respective RBs are indexed first and then the second subsets are indexed.

In the above-described operation, RB and/or subset indices can be changed on a subframe basis according to parameters such as a subframe index, C-RNTI of the UE or cell ID. For example, an offset value independently given per subframe can be applied to RB indices or subset indices when candidate positions of a specific UE are determined.

FIG. 18 illustrates an example of changing candidate positions using an offset value.

Referring to FIG. 18, offset 1 is applied to aggregation level 1, offset 0 is applied to aggregation levels 2 and 8 and offset 2 is applied to aggregation level 4 while the RB indices are maintained (i.e. offset value is fixed to 0). Consequently, candidate positions of aggregation level 1 correspond to odd-numbered subsets in FIG. 18, distinguished from FIG. 17. In this case, E-PDCCH blocking does not occur between a UE that searches even-numbered subsets for the E-PDCCH of aggregation level 1 and a UE that searches odd-numbered subsets for the E-PDCCH of aggregation level 1. E-PDCCH blocking refers to absence of an E-PDCCH resource that can be allocated for E-PDCCH transmission of a UE since resources in a search space are used for E-PDCCH transmission for another UE. The operation with respect to aggregation level 1 is applicable to aggregation level 4.

The offset value illustrated in FIG. 18 can be changed based on subframe (subframe-wise offset). Referring to FIGS. 17 and 18, FIG. 17 is applicable to a specific subframe and FIG. 18 is applicable to another subframe. The offset value applied to the search space can be set differently for each aggregation level as illustrated in FIG. 18. The offset value can be determined according to a specific seed value. For example, when the seed value is set to s, the offset value of aggregation level L can be given as s*L. Subframe-wise offset may not be used as necessary. For example, if multiple cells have different offset values when the multiple cells simultaneously transmit E-PDCCHs, it may be difficult to perform joint transmission. In this case, the BS can configure whether or not the subframe-wise offset is applied through a higher layer such as RRC for more effective operation.

The above-described gap (or offset) between candidate positions can be varied. For example, the presence or absence of the gap or the size of the gap can depend on a system bandwidth or the size of an RB set (i.e. the number of RBs) allocated for E-PDCCH transmission. For example, if no gap (or offset) is present between candidate positions, as shown in FIG. 12, the E-PDCCH search space is generated using consecutive RBs or subset indices, and thus the size of the RB set occupied by the E-PDCCH search space decreases. If the search space of aggregation level 1 is configured using positions corresponding to indices 0 to 5 and one RB includes two subsets, the search space of aggregation level 1 can be configured using a total of three RBs. Here, a gap of size 1 is given between candidate positions of aggregation level 1, a total of six RBs can be used since the search space of aggregation level 1 is configured using positions corresponding to indices {0, 2, 4, 6, 8, 10}. Accordingly, if the system bandwidth is narrow or the size of the RB set allocated for the E-PDCCH search space is small (e.g. if the size of RB set is set to lower than a predetermined reference value), the search space is advantageously configured with only a small number of RBs without having a gap since the number of RBs that can be used for PDSCH transmission can be secured, for example. On the other hand, if the system bandwidth is wide or the size of RB set allocated for the E-PDCCH search space is large (e.g. if the RB set size is set to greater than the predetermined reference value), candidate positions are advantageously uniformly distributed over a large number of RBs with an appropriate gap for frequency selective E-PDCCH transmission. That is, as the system bandwidth or E-PDCCH search space RB set size increases, a larger gap can be set between candidate positions. Otherwise, in order to flexibly set a gap that the BS desires, the gap between candidate positions can be signaled through a higher layer signal such as an RRC signal.

Figure 19:
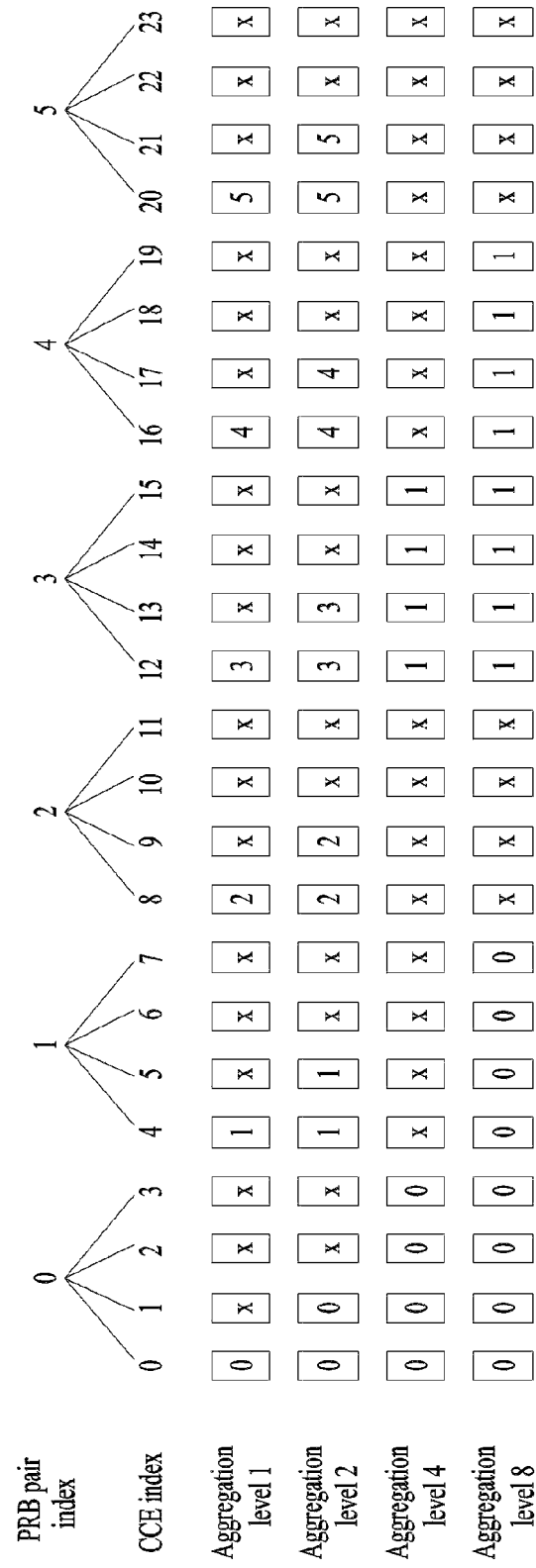

FIG. 19 illustrates an example of configuring a search space with an appropriate gap present between candidate positions. FIG. 19 assumes that four CCEs are configured from one PRB pair. Referring to FIG. 19, CCEs necessary for E-PDCCH candidate transmission at each aggregation level are consecutively allocated starting from index #0. Here, a gap is applied between E-PDCCH candidate positions and thus the E-PDCCH candidate positions are non-consecutively distributed in the CCE domain.

The method of providing a gap between candidate positions, proposed by the present invention, is applicable to a method of transmitting E-PDCCHs in a distributed manner.

Figure 20:
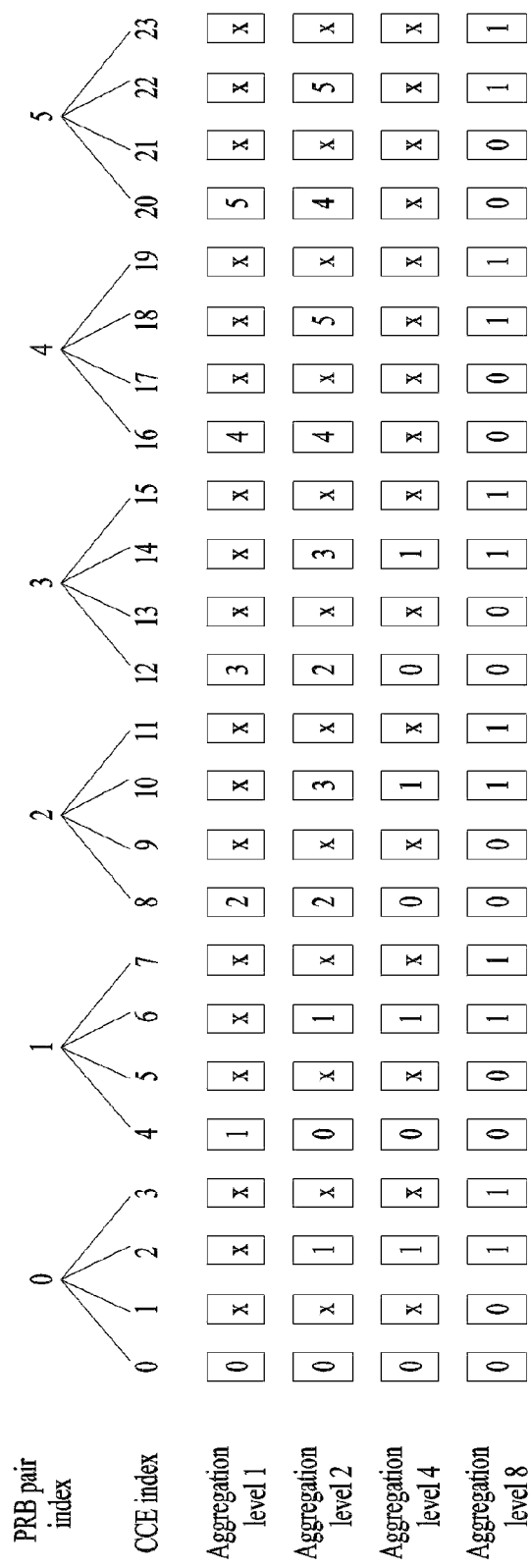

FIG. 20 illustrates an example of applying a gap between candidate positions to transmit E-PDCCHs in a distributed manner. Referring to FIG. 20, in the case of aggregation level 2, one CCE is extracted from each of two different PRB pairs to configure a candidate position, and thus DCI can be transmitted using resources spaced apart in the frequency domain. In this case, a predetermined gap (e.g. 1 CCE in the case of aggregation level 2) can be provided between candidate positions such that candidate positions are uniformly distributed through all E-PDCCH PRB pairs. If only one CCE for a candidate position aggregation level 2 can be allocated to one PRB pair since a sufficient number of PRB pairs is set, which is not shown, candidate positions can be distributed in a wider frequency region. For example, candidate position #0 can be configured with CCE #0 and CCE #4 and candidate position #1 can be configured with CCE #8 and CCE #12. This principle is equally/similarly applicable to aggregation levels 4 and 8.

The method of applying a gap between candidate positions, proposed by the present invention, is applicable to a case in which CCE indexing is performed in a different manner.

Figure 21:
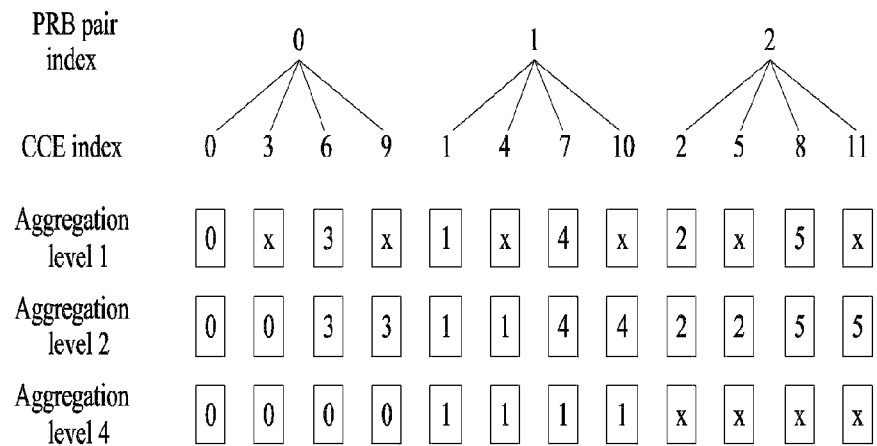

FIG. 21 illustrates non-sequential CCE indexing in search space configuration. FIG. 21 assumes a case in which three PRB pairs are provided through RRC for E-PDCCH transmission and four CCEs are configured from each PRB pair. Referring to FIG. 21, the PRB pairs are indexed in such a manner that second CCEs of the PRB pairs are indexed upon indexing of first CCEs of the PRB pairs. In this case, candidate positions #0, #1 and #2 are configured using consecutive CCEs (i.e. with zero gap) and candidate position #3 is configured with a gap (i.e. offset) corresponding to three CCEs from candidate position #2 at aggregation level 1. This prevents CCEs used for candidate positions of aggregation level 1 from overlapping with CCEs used for candidate positions of aggregation level 2 so as to reduce E-PDCCH blocking probability. For example, if a gap is not applied at aggregation level 1, CCE #3 is assigned as a resource for candidate position #3. In this case, candidate positions #0 and #3 of aggregation level 1, which correspond to candidate position #0 of aggregation level 2, cannot be used for actual transmission if candidate position #0 of aggregation level 2 is used for actual transmission. However, when a gap is applied to aggregation level 1, as described above, candidate positions #0 and #3 of aggregation level 1 can be used even if candidate position #0 of aggregation level 2 is used for actual transmission. When CCE indexing is performed as illustrated in FIG. 21, if N PRB pairs are set for localized E-PDCCH transmission of aggregation level L, CCEs #n, #n+N, #n+2N, . . . , #n+(L−1)N can be used.

Figure 22:
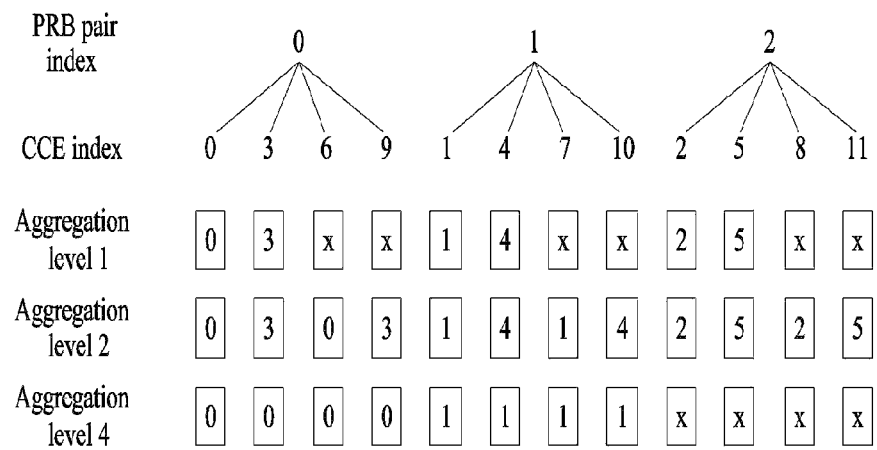

An operation similar to FIG. 21 can be implemented without a gap between candidate positions, which is illustrated in FIG. 22. In the example of FIG. 22, candidate positions can be configured using consecutive CCEs without a gap between candidate positions. Referring to FIG. 22, six candidate positions are configured using CCEs #0 to #5 at aggregation level 1. In this case, two CCEs can be aggregated with a predetermined spacing in each PRB pair in order to avoid a case in which CCEs used for aggregation level 2 correspond to candidate positions of aggregation level 1. That is, CCE #n and CCE #n+2L can be aggregated to configure candidates of aggregation level 2. Whether the operation of aggregating CCEs with a spacing in the same PRB pair is applied or not can depend on the number of CCEs configured in one PRB pair or aggregation level.

Figure 23:
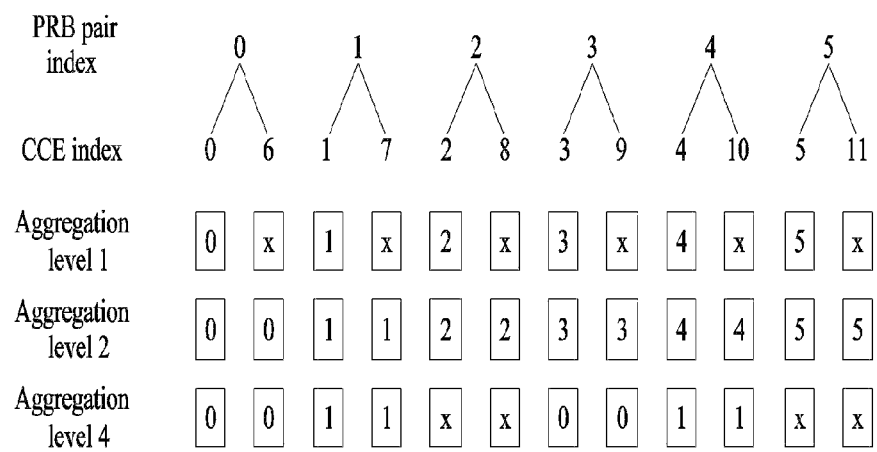

When two CCEs are configured from one PRB pair, as illustrated in FIG. 23, CCEs can be combined without a gap since the corresponding aggregation level can be possible when all CCEs belonging to one PRB pair are used. When two CCEs are configured from one PRB pair, as illustrated in FIG. 23, two PRB pairs are needed to configure a candidate of aggregation level 4. In this case, a PRB pair to which a CCE spaced apart by a predetermined distance from a CCE corresponding to the starting point of aggregation can be used. For example, when N (e.g. N=5) PRB pairs are set as an E-PDCCH transmission region, if it is assumed that four CCEs starting from CCE #n (e.g. CCE #0) are aggregated, CCE #n+N (e.g. CCE #6) belonging to the same PRB pair is used first and then CCE #n+N/2 (e.g. CCE #3) and CCE #n+N/2+N (e.g. CCE #9), obtained by adding an offset (N/2=3 in FIG. 23) corresponding to half the number of all PRB pairs to the CCE index, are used to configure candidate positions. A floor function may be applied to make the CCE indices integers as necessary. This scheme is applicable when two or more PRB pairs need to be used since a corresponding candidate positions cannot be configured even when all CCEs belonging to one PRB pair are used (when candidate positions of aggregation level 8 are configured in the case of generation of four CCEs per PRB pair). In this case, if one candidate position is configured using K PRB pairs, the offset value can be N/K or an integer close thereto. In other words, CCEs spaced apart by the offset (or resources in corresponding PRB pairs) can be used to complement insufficient CCEs. Here, the offset value is set to N/K because collision with a CCE used for a different candidate position can be reduced by additionally using a CCE which is considerably spaced apart from among all CCEs since CCEs of consecutive indices are aggregated to configure one candidate position.

Figure 24:
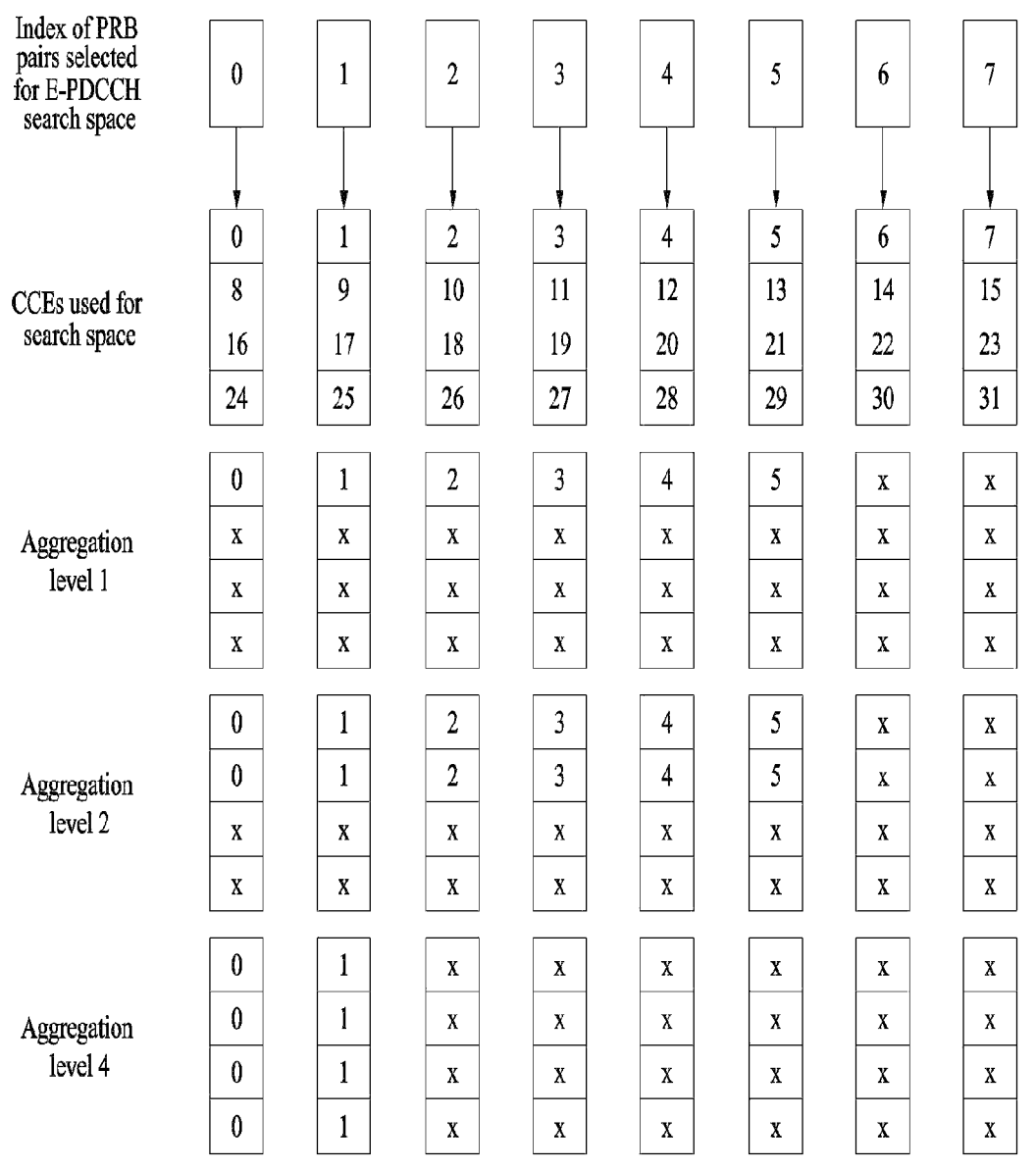
Figure 25:
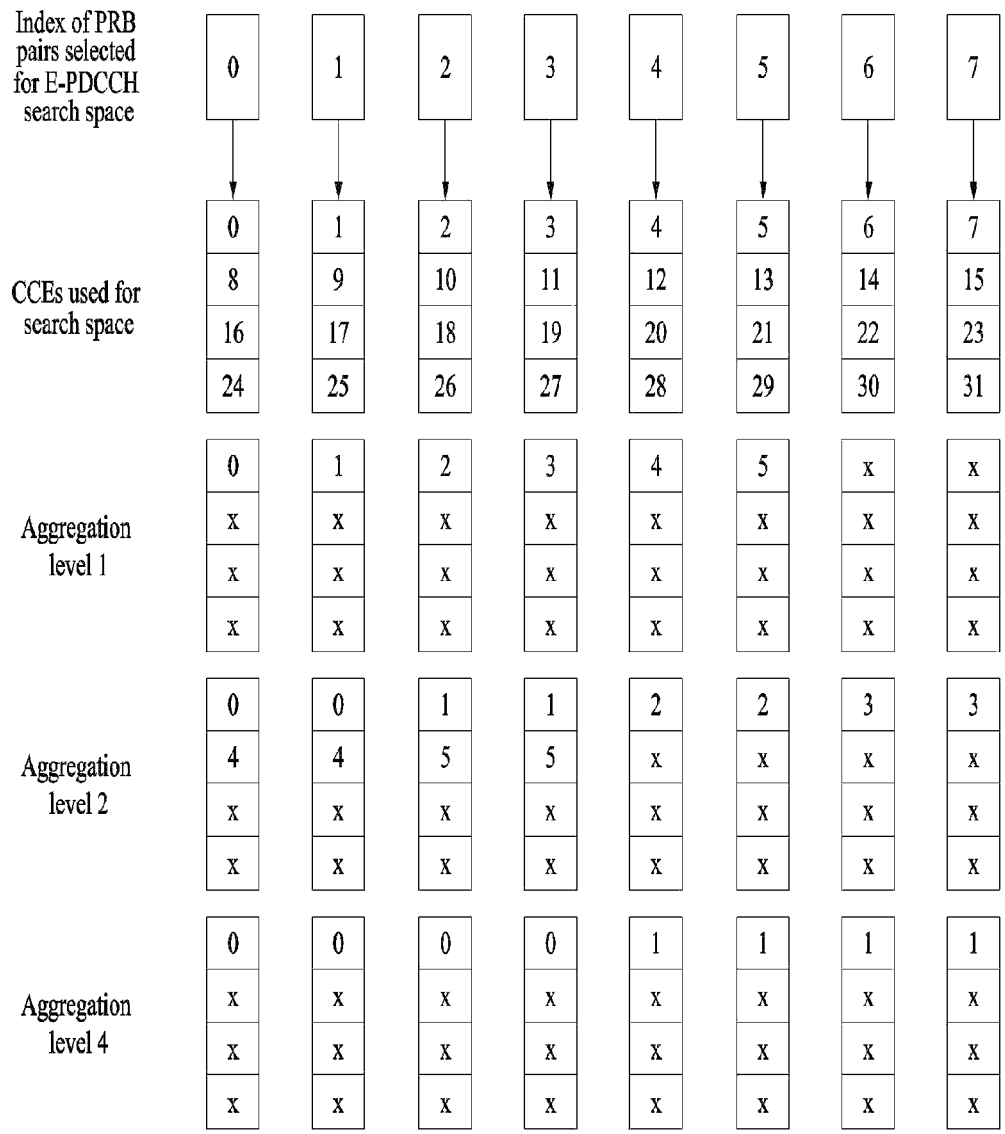

FIGS. 24 and 25 illustrate search space configuration according to the principle of the present invention when CCE indices are preferentially assigned to PRB pairs. Here, a localized candidate refers to a case in which one candidate belongs to one PRB pair and a distributed candidate refers to a case in which one candidate belongs to a plurality of PRB pairs. A predetermined offset can be applied between starting CCE indices of search spaces of aggregation levels to avoid overlap of CCEs between search spaces of different aggregation levels, which is not shown.

FIG. 24 shows a localized candidate case. Here, k-th E-PDCCH candidate of aggregation level L uses CCEs $\#n_{k,L}$, $\#n_{k,L}+N, \ldots, \#n_{k,L}+(L-1)N$ and neighboring starting points can have a relationship of CCE $n_{k+,L}$=CCE $n_{k,L}+T$ (e.g. T=1) without a gap therebetween.

Expression 1 represents a CCE configuring k-th candidate of aggregation level L.

$$(Y+k+i*N) \bmod A \quad \text{[Expression 1]}$$

Here, Y denotes an offset value for the corresponding search space and can be independently given per aggregation level, k represents the k-th E-PDCCH candidate, i is 0, 1, ..., L−1 and N represents the number of RBs (RB pairs) configured for E-PDCCH transmission. Here, an RB (RB pair) includes a VRB (VRB pair) or a PRB (PRB pair). In addition, A denotes the number of CCEs configured for E-PDCCH transmission.

While Expression 1 represents a case in which no gap is present between starting points of neighboring E-PDCCHs, this is exemplary and a predetermined gap (=T=1) can be given between neighboring E-PDCCHs.

Expression 2 represents a CCE configuring the k-th candidate of aggregation level L when a gap (T) is present between starting points of neighboring E-PDCCHs.

$$(Y+Tk+i*N) \bmod A \quad \text{[Expression 2]}$$

Here, Y, k, i, N and A are defined in the same manner as in Expression 1. T is a positive integer and can be set to a value less than L. Here, T representing the gap can be a parameter varying according to aggregation level, the number of CCEs per PRB pair, the number of PRB pairs configured as an E-PDCCH search space, etc.

FIG. 25 illustrates a distributed candidate case. Here, the k-th candidate of aggregation level L uses CCEs $\#n_{k,L}$, $\#n_{k,L}+1, \ldots, \#n_{k,L}+(L-1)$ and a gap corresponding to the corresponding aggregation level is present between starting points of E-PDCCH candidates. For example, the starting points of E-PDCCH candidates can have a relationship of CCE $\#n_{k+1,L}$=CCE $\#n_{k,L}+L+T-1$. Here, T is an additional gap applied between the starting points of E-PDCCH candidates. When an additional gap is not present, T can be set to 1.

Expression 3 represents a CCE configuring the k-th candidate of aggregation level L.

$$(Y+L*k+i) \bmod A \quad \text{[Expression 3]}$$

Here, Y represents an offset value for the corresponding search space and can be independently given per aggregation level. L denotes the aggregation level, k represents the k-th E-PDCCH candidate of aggregation level L, i is 0, 1, ..., L−1, and A denotes the number of CCEs configured for E-PDCCH transmission.

Expression 4 represents a CCE configuring the k-th candidate of aggregation level L when the gap T is present between starting points of E-PDCCHs.

$$(Y+T*k+i) \bmod A \quad \text{[Expression 4]}$$

Here, Y, L, k, i and A are defined in the same manner as in Equation 3. T is a positive integer and can be set to a value less than L. Here, T representing the gap can be a parameter varying according to aggregation level, the number of CCEs per PRB pair, the number of PRB pairs configured as an E-PDCCH search space, etc.

While it is assumed that a CCE corresponding to a basic aggregation unit is derived from one PRB pair when distributed candidates are configured in the above-described example, the search space configuration scheme is applicable to other cases. That is, the search space configuration scheme can be applied to a case in which individual CCEs configuring distributed candidates are composed of REs of a plurality of PRB pairs.

For example, CCEs are indexed and then a search space can be configured according to the above-described operation principle based on the CCE index (that is, appropriate CCE indices are collected according to whether candidates are localized candidates or distributed candidates and an appropriate gap is applied between starting points of E-PDCCH candidates). In this case, K CCEs for localized candidates, which are positioned in different PRB pairs, can be redistributed to configure K CCEs for distributed candidates in order to index CCEs in the same manner as CCEs for localized candidates, which are composed of REs in a single PRB pair.

Figure 26:
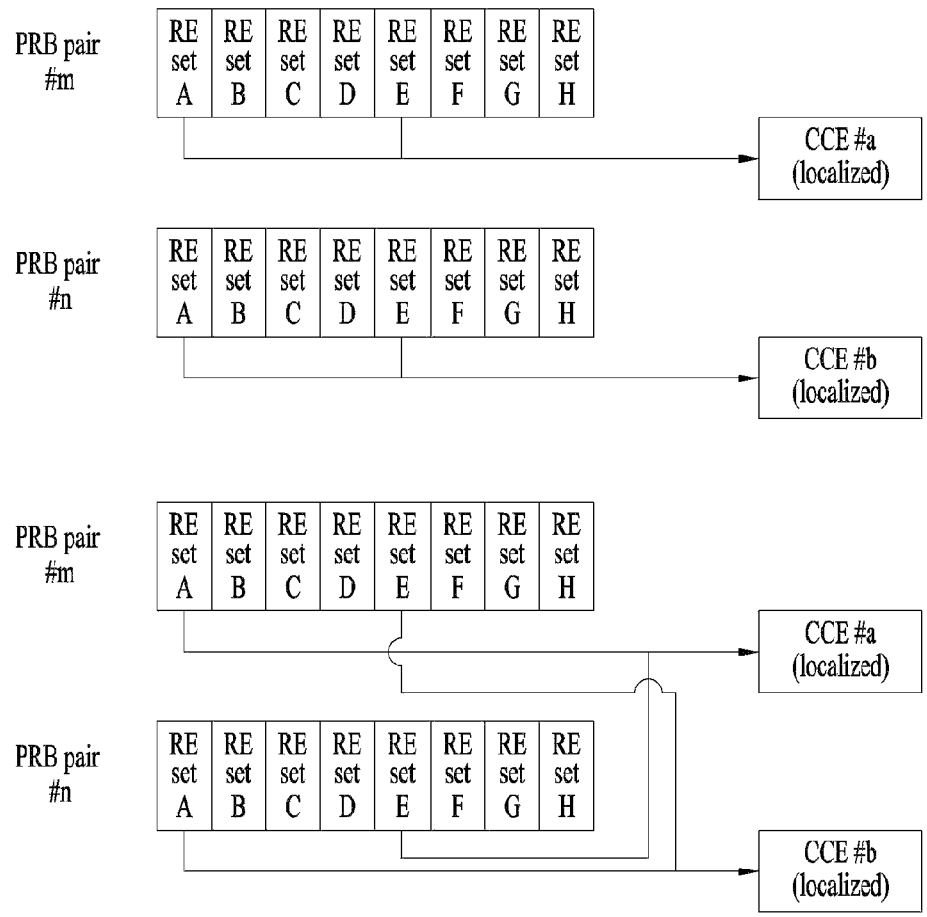
FIG. 26 illustrates a base station (BS) and UE applicable to the present invention.

FIG. 26 illustrates configuration of a CCE by combining RE sets in a PRB pair.

Referring to FIG. 26, each PRB pair is divided into a predetermined number of RE sets and RE sets are combined to configure a CCE. For example, RE sets A and E in PRB pair #m are combined to configure localized type CCE #a and the same operation is repeated on PRB pair #n to configure localized type CCE #b. For distributed type CCE configuration, RE set A of PRB pair #m and RE set E of PRB pair #n are combined to configure distributed type CCE #a and RE set A of PRB pair #n and RE set E of PRB pair #m are combined to configure distributed type CCE #b. K (e.g. K=2) distributed CCEs configured in this manner respectively occupy indices of K localized CCEs (i.e. K localized CCEs which can be configured through the same RE set) corresponding thereto. Accordingly, even when distributed candidate CCEs are transmitted through a plurality of PRB pairs, the distributed candidate CCEs can be indexed while coexisting with localized candidate CCEs and can configure a search space according to the above-described proposed scheme.

Figure 27:
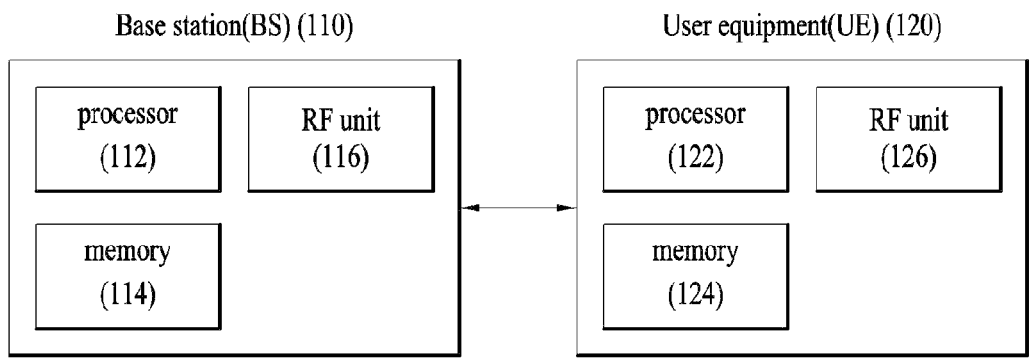
FIG. 27 illustrates a B.S. a relay and a UE applicable to the present invention.

FIG. 27 illustrates a BS, a relay and a UE applicable to the present invention.

Referring to FIG. 27, a wireless communication system includes a BS 110 and a UE 120. When the wireless communication system includes a relay, the BS or UE can be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 112 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, a BS or other apparatuses of a wireless communication system. Specifically, the present invention can be applied to a method for transmitting uplink control information and an apparatus for the same.

The invention claimed is:

1. A method for receiving a downlink control channel by a communication device in a wireless communication system, the method comprising:
  determining a resource block pair (RB) set for localized mapping, the RB pair set being a subset of bandwidth and divided into a control channel element set on which downlink control channel candidates are defined; and
  monitoring the downlink control channel candidates on the control channel element set of the RB pair set in a subframe to detect a downlink control channel allocated to the communication device,
  wherein the downlink control channel candidates include $n^{th}$ and $n+1^{th}$ downlink control channel candidates of an aggregation level,
  wherein the $n^{th}$ and $n+1^{th}$ downlink control channel candidates of the aggregation level are separated by a gap on the control channel element set, and
  wherein gap size depends on a number of control channel elements in an RB pair of the RB pair set.

2. The method according to claim 1, wherein the downlink control channel candidates are present after a specific orthogonal frequency division multiplexing (OFDM) symbol in the subframe, and the specific OFDM symbol is not a starting OFDM symbol of the subframe.

3. The method according to claim 1, wherein RB pairs other than the RB pair set in the bandwidth are resources for physical downlink shared channel (PDSCH) transmission.

4. The method according to claim 1, wherein the downlink control channel includes an enhanced physical downlink control channel (E-PDCCH).

5. A communication apparatus for use in a wireless communication system, comprising:
  a radio frequency (RF) unit; and
  a processor,
  wherein the processor is configured to determine a resource block (RB) pair set for a localized mapping, the RB pair set being a subset of a bandwidth and divided into a control channel element set on which downlink control channel candidates are defined and to monitor the downlink control channel candidates on the control channel element set of the RB pair set in a subframe to detect a downlink control channel allocated to the communication device,
  wherein the downlink control channel candidates includes $n^{th}$ and $n+1^{th}$ downlink control channel candidates of an aggregation level,
  wherein the $n^{th}$ and $n+1^{th}$ downlink control channel candidates of the aggregation level are separated by a gap on the control channel element set, and
  wherein gap size depends on a number of control channel elements in an RB pair of the RB pair set.

6. The communication apparatus according to claim 5, wherein the downlink control channel candidates are present after a specific OFDM symbol in the subframe, and the specific OFDM symbol is not a starting OFDM symbol of the subframe.

7. The communication apparatus according to claim 5, wherein RB pairs other than the RB pair set in the bandwidth are resources for PDSCH transmission.

8. The communication apparatus according to claim 5, wherein the downlink control channel includes an E-PDCCH.

* * * * *